United States Patent [19]
Imura et al.

[11] Patent Number: 5,926,656
[45] Date of Patent: Jul. 20, 1999

[54] VIBRATION REDUCING APPARATUS AND LENS BARREL

[75] Inventors: Yoshio Imura, Kawasaki; Hiroshi Tanioka, Kashiwa; Tetuji Kamata, Kawasaki, all of Japan

[73] Assignee: Nikon Corporation, Tokyo, Japan

[21] Appl. No.: 09/037,883

[22] Filed: Mar. 10, 1998

[30]     Foreign Application Priority Data

Mar. 11, 1997  [JP]  Japan .................................. 9-056466
Mar. 11, 1997  [JP]  Japan .................................. 9-056505

[51] Int. Cl.⁶ ................................................. G03B 17/00
[52] U.S. Cl. ................................................. 396/55
[58] Field of Search ........................... 396/55; 359/554, 359/557

[56]             References Cited

U.S. PATENT DOCUMENTS 5,748,995  5/1998  Kitagawa et al. ........................ 396/55
5,845,157  12/1998  Imura et al. ............................. 396/55

OTHER PUBLICATIONS

U.S. application No. 08/876,594, filed Jun. 16, 1997, Imura, Nikon Corporation.

*Primary Examiner*—W. B. Perkey

[57]                 ABSTRACT

A vibration reducing apparatus housed in the internal periphery of a tubular member comprises a vibration reducing optical system which reduces a vibration, a supporting frame which supports the vibration reducing optical system, provided in at least a part of the external periphery with a gap portion which forms a gap to the internal periphery of the tubular member, and a drive unit which drives the supporting frame in a direction perpendicular or substantially perpendicular to an optical axis.

51 Claims, 12 Drawing Sheets

VIBRATION REDUCING APPARATUS AND LENS BARREL

The entire disclosure of Japanese Patent Application Nos. 9-056466 and 9-056505 including the specifications, claims, drawings, and summaries is incorporated herein by reference.

BACKGROUND OF THE INVENTION

1. Field of the Invention

The present invention relates to a vibration reducing apparatus and a lens barrel, capable of reducing a vibration produced by, for example, by hand vibration in a camera or the like.

2. Related Background Art

There are already known a vibration reducing apparatus constituting at least a part of an image taking optical system and including a vibration reducing lens for reducing the vibration, a lens support frame for supporting such vibration reducing lens and a driving mechanism for driving the lens support frame in a direction perpendicular or substantially perpendicular to the optical axis, and a lens barrel incorporating such vibration reducing apparatus. The lens support frame is provided with coils, constituting a part of the driving mechanism, respectively in an X-axis direction and in a Y-axis direction. In a fixed member of the lens barrel there is supported a set of a yoke and a permanent magnet, respectively corresponding to each of the coils in the X- and Y-axis directions provided in the lens support frame. Such yokes and permanent magnets constitute a part of the driving mechanism. As a magnetic field is formed between the yoke and the permanent magnet, the lens support frame receives a driving force and therefore moves in the X- or Y-direction when a current is supplied in the corresponding coil.

However, in the lens barrel equipped with the conventional vibration reducing apparatus, the driving mechanism protrudes from the external periphery of the lens support frame. For this reason, in the lens barrel of the above-mentioned structure, the internal periphery has to be of a size capable of housing the driving mechanism including the portion protruding from the external periphery of the lens support frame. Also in case of placing, for example, a diaphragm mechanism at an object side of the vibration reducing apparatus, there are required a drive source provided in the camera body and an axially extended link member for transmitting the driving force from the drive source thereby driving the diaphragm mechanism. In such situation, in order to prevent the interference between the link member and the driving mechanism protruding from the external periphery of the lens support frame, the link member has to be positioned outside the driving mechanism. As a result, the radial size of the lens barrel may become large, so that the entire lens barrel may become bulky.

On the other hand, the conventional vibration reducing apparatus has to be installed within a limited space in the lens barrel. Therefore, if the vibration reducing apparatus can be formed as a compact unit, the installation of such unit into the lens barrel can be conducted in an efficient manner. Also, if such vibration reducing unit is made lighter in weight, the installing work can be achieved more easily. However the vibration reducing apparatus, incorporating the complex driving mechanism, tends to become bulky, so that it is difficult to realize a compact and light vibration reducing unit.

Also the conventional vibration reducing apparatus is provided with an electrical circuit for driving and controlling the vibration reducing lens. However, it is difficult to secure the space for mounting the electrical circuit when the vibration reducing apparatus is formed as a compact unit. It is also possible to first install the vibration reducing unit in the lens barrel and then to connect the vibration reducing unit with an electrical circuit provided in the lens barrel. However the wiring operation is difficult within the limited space of the lens barrel. Consequently, in compactizing the vibration reducing unit, it is necessary to secure, in the vibration reducing unit, the installation space for the electrical circuit.

SUMMARY OF THE INVENTION

It is an object of the present invention to provide a vibration reducing apparatus capable of reducing the radial size, thereby contributing to the compactization and also capable of being formed as a unit with reduced size and weight, thereby securing an installation space for the components, and a lens barrel adapted for use with such vibration reducing apparatus.

In order to achieve the above-mentioned object, according to a first aspect of the present invention, there is provided a vibration reducing apparatus housed in the internal periphery portion of a tubular member, comprising a vibration reducing optical system which reduces a vibration, a support frame adapted to support the vibration reducing optical system and provided, in at least a part of the external periphery thereof, with a gap portion which forms a gap to the internal periphery of the tubular member, and a drive unit which drives the support frame in a direction perpendicular or substantially perpendicular to an optical axis.

Advantageously, the drive unit includes a first driving force generation device which drives the vibration reducing optical system in a first direction and a second driving force generation device which drives the vibration reducing optical system in a second direction which is skewed relative to the first direction. The first and second driving force generation devices are positioned around an optical axis with a predetermined angular distance therebetween, and the support frame is provided with a mounting portion protruding from the external periphery thereof and serving to be connected with at least a part of the first and second driving force generation devices. The first and second driving force generation devices are composed of voice coil motors. Also the gap portion mentioned above is a recess portion formed on the external periphery of the frame member or the base frame member.

According to a second aspect of the present invention, there is provided a vibration reducing apparatus comprising a base frame member adapted to be housed in the internal periphery portion of a tubular member and provided, in at least a part of the external periphery of the base frame member, with a gap portion for forming a gap to the internal periphery of the tubular member, a vibration reducing optical system provided in the internal periphery portion of the base frame member and adapted to reduce a vibration, a support frame provided in the internal periphery portion of the base frame member and adapted to support the vibration reducing optical system, and a drive unit provided in the internal periphery portion of the base frame member and adapted to drive the support frame in a direction perpendicular or substantially perpendicular to an optical axis.

Advantageously, the base frame member is divided into a first frame member and a second frame member, at least one of which is provided, in at least a part of the external periphery thereof, with a gap portion. Otherwise the base frame member is divided into first and second frame members, which are provided, in at least a part of the external periphery thereof, with a continuous gap portion.

The drive unit includes a first driving force generation device which drives the vibration reducing optical system in a first direction, a second driving force generating device which drives the vibration reducing optical system in a second direction which is skewed relative to the first direction, and a guide member which guides the vibration reducing optical system driven by at least one of the first and second driving force generation devices, wherein the gap portion is formed in the proximity of at least one of the first and second driving force generation devices and the guide member.

Advantageously, a flat portion is formed in at least a part of the gap portion, which serves as a mounting portion which mounts components to be mounted. The gap portion is constituted by a recess formed on the external periphery of the frame member or the base frame member.

According to a third aspect of the present invention, there is provided a lens barrel including a tubular member, wherein the tubular member comprises, on the internal periphery portion thereof, a vibration reducing optical system which reduces a vibration, a support frame adapted to support the vibration reducing optical system and provided, in at least a part of the external periphery portion of the support frame, with a gap portion which forms a gap to the internal periphery of the tubular member, and a member extended in the direction of the optical axis and adapted to incorporate a vibration reducing apparatus provided with a drive unit which drives the support frame in a direction perpendicular or substantially perpendicular to an optical axis, wherein the gap portion serves as an escape portion which allows the member to escape.

Advantageously, the drive unit includes a first driving force generation device which drives the vibration reducing optical system in a first direction, and a second driving force generating device which drives the vibration reducing optical system in a second direction which is skewed relative to the first direction, and the above-mentioned axially extended member is provided in a position opposed or substantially opposed, across the optical axis, to at least one of the first and second driving force generation devices. The axially extended member is a driving member which generates or transmits the driving force for driving at least a part of the optical system or a diaphragm unit. The driving member mentioned above is composed of a DC motor or an ultrasonic motor.

According to a fourth aspect of the present invention, there is provided a lens barrel having a tubular member, wherein the tubular member comprises, in the internal periphery portion thereof, a vibration reducing apparatus including a base frame member housed in the internal periphery portion and provided, in at least a part of the external periphery of the base frame member, with a gap portion which forms a gap to the internal periphery of the tubular member, a vibration reducing optical system provided in the internal periphery portion of the base frame member and adapted to reduce a vibration, a support frame provided in the internal periphery portion of the base frame member and adapted to support the vibration reducing optical system, and a drive unit provided in the internal periphery portion of the base frame member and adapted to drive the support frame in a direction perpendicular or substantially perpendicular to an optical axis, and a member extended in the axial direction is further provided, and the gap portion serves as an escape portion which allows the above-mentioned axially extended member to escape.

According to a fifth aspect of the present invention, there is provided a vibration reducing apparatus housed in the internal periphery portion of a tubular member, and comprising a vibration reducing optical system which reduces a vibration, a support frame which supports the vibration reducing optical system, a drive unit which drives the support frame in a direction perpendicular or substantially perpendicular to an optical axis, an optical member provided in front of or behind the vibration reducing optical system, a fixing unit which fixes the optical member, and a connecting unit which connects the optical member with the fixing unit, wherein the support frame is provided, in at least a part of the external periphery thereof, with a gap portion which forms a gap to the internal periphery of the tubular member, and the above-mentioned connecting unit is provided in the gap portion.

Advantageously, the optical member is lens groups, a diaphragm unit, a diaphragm-shutter unit or a combination thereof. In the gap portion, there is provided a position detection unit which detects the position of the vibration reducing optical system.

The drive unit includes a first driving force generation device which drives the vibration reducing optical system in a first direction and a second driving force generation device which drives the vibration reducing optical system in a second direction which is skewed relative to the first direction, and the first and second driving force generation devices are positioned about the optical axis with an angular space of 90° or about 90° therebetween, and the support frame is provided with a mounting portion protruding from the external periphery thereof and serving to mount at least a part of the first and second driving force generation devices. The first and second driving force generation devices are composed of voice coil motors.

The connecting unit is composed of axial members provided in three positions, which are mutually separated by 120° about the optical axis. At least one of the axial members is positioned within a range of 90° or about 90° between the first and second driving force generation devices.

According to a sixth aspect of the present invention, there is provided a vibration reducing apparatus housed in the internal periphery portion of a tubular member and comprising a vibration reducing optical system which reduces a vibration, a support frame which supports the vibration reducing optical system, a drive unit which drives the support frame in a direction perpendicular or substantially perpendicular to an optical axis, a first optical member provided in front of the vibration reducing optical system, a second optical member provided behind the vibration reducing optical system, and a connecting unit which connects the first and second optical members, wherein the support frame is provided, in at least a part of the external periphery thereof, with a gap portion which forms a gap to the internal periphery of the tubular member, and the connecting unit is positioned in the above-mentioned gap portion.

According to a seventh aspect of the present invention, there is provided a vibration reducing apparatus incorporated in the internal periphery portion of a tubular member and comprising a vibration reducing optical system which reduces a vibration, a support frame which supports the vibration reducing optical system, a drive unit which drives the support frame in a direction perpendicular or substantially perpendicular to an optical axis, and a base member housing the support frame and the drive unit in the internal periphery portion and adapted to be dividable into first and second frame members, wherein the support frame is provided, in at least a part of the external periphery thereof, with a gap portion which forms a gap to the internal periphery of the tubular member, and a frame connecting unit which connects the first and second frame members is provided in the gap portion.

Advantageously, at least one of the first and second frame members is provided with an optical member.

According to an eighth aspect of the present invention, there is provided a vibration reducing apparatus housed in the internal periphery portion of a tubular member and comprising a vibration reducing optical system which reduces a vibration, a support frame which supports the vibration reducing optical system, and a drive unit which drives the support frame in a direction perpendicular or substantially perpendicular to an optical axis, wherein the support frame is provided, in at least a part of the external periphery thereof, with a gap portion which forms a gap to the internal periphery of the tubular member, and a support unit which movably supports the support frame is provided in the gap portion.

Advantageously, the support unit includes a guide unit in contact with the support frame and guiding the support frame in a predetermined direction, and a biasing unit which biases the support frame toward the guide unit. At least one of the support unit, the guide unit and the biasing unit is composed of axial members provided in three positions about the optical axis, with a mutual angular distance of 120°.

The above and other objects, features and advantages of the present invention will be explained hereinafter and may be better understood by reference to the drawings and the descriptive matter which follows.

DETAILED DESCRIPTION OF THE PREFERRED EMBODIMENTS

[First Embodiment]

Figure 1:
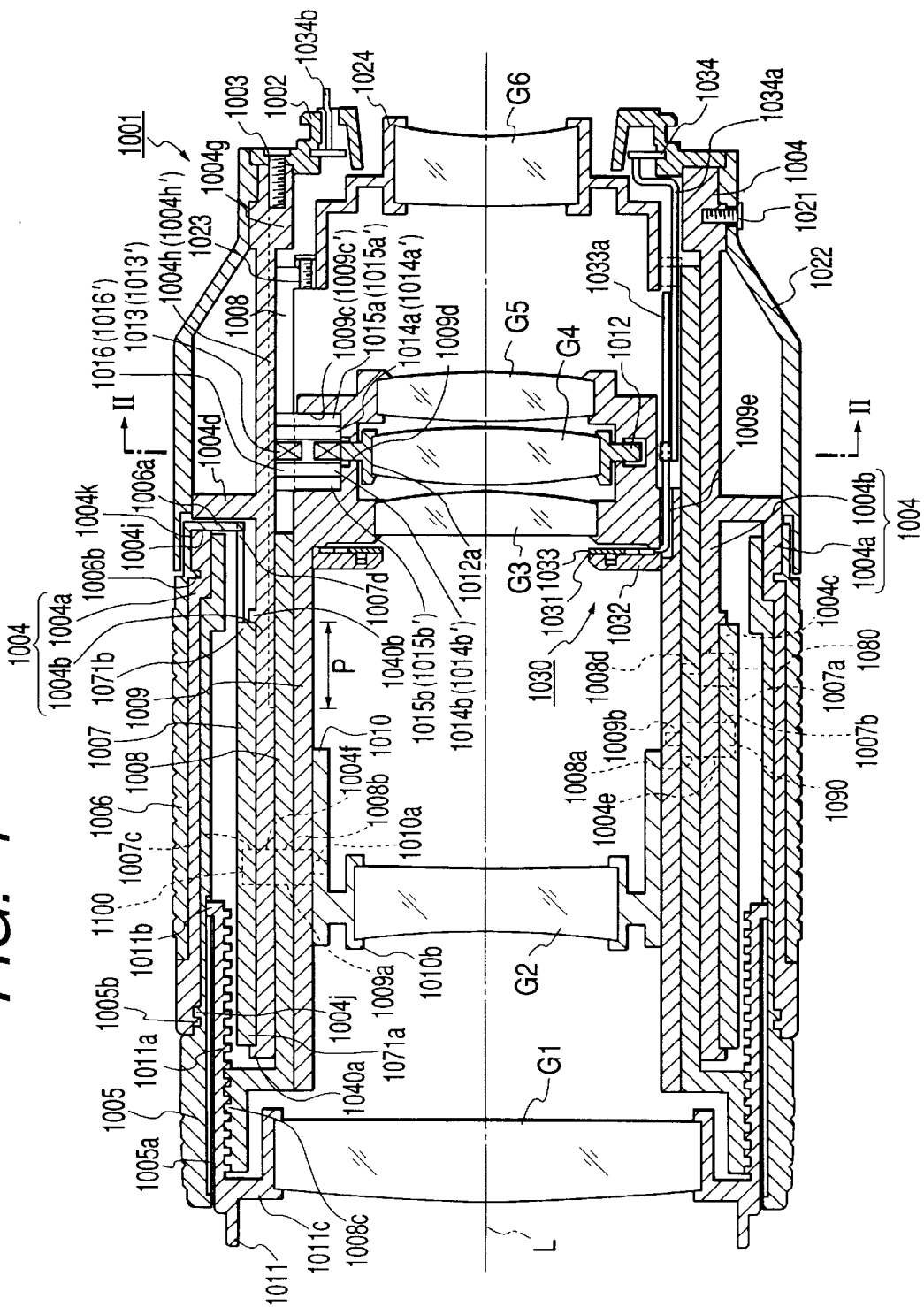
FIG. 1 is a sectional view of a lens barrel constituting a first embodiment of the present invention.
Figure 2:
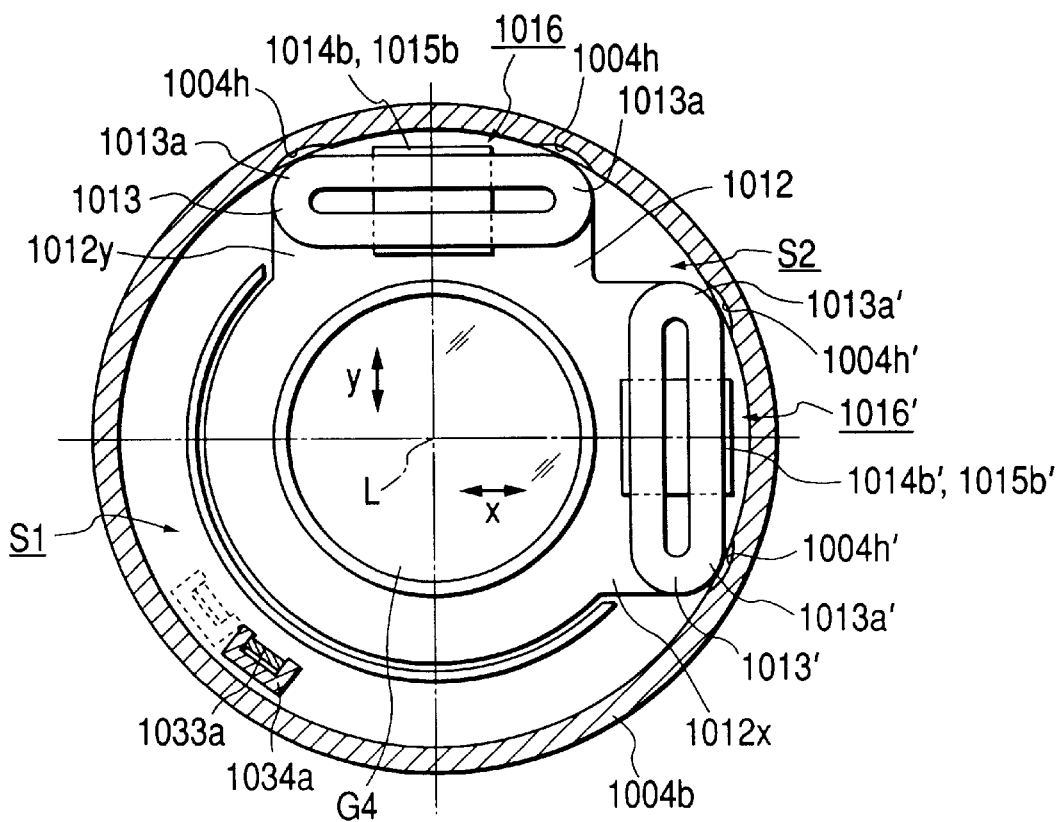
FIG. 2 is a sectional view taken along a line II—II in FIG. 1.

FIG. 1 is a sectional view of a lens barrel constituting a first embodiment of the present invention, and FIG. 2 is a sectional view taken along a line II—II in FIG. 1.

In FIG. 1, an escape groove 1004*h*', a housing portion 1009*c*' and a voice coil motor 1016' are omitted from the illustration and the reference numbers are indicated with parentheses.

The lens barrel 1001 is composed of a first lens group G1, a second lens group G2, a diaphragm 1030, a third lens group G3, a fourth lens group (vibration reducing lens) G4, a fifth lens group G5 and a sixth lens group G6 constituting an image taking optical system; lens support frames 1011, 1024, a sliding tube 1010, a vibration reducing lens frame 1012, sliding tubes 1008, 1009, a fixed tube 1004 consisting of an outer tube portion 1004*a* and an inner tube portion 1004*b*, a zoom cam ring 1007 rotatably supported between the outer tube portion 1004*a* and the inner tube portion 1004*b*, a zooming operation ring 1006 for rotating the zoom cam ring 1007, and a focusing operation ring 1005 for driving the lens support frame 1011.

A mount member 1002 of the lens barrel side detachably engages with a mount unit of the camera body side, provided in a camera body (not shown). The lens barrel side mount member 1002 rotatably supports a rotary ring 1034, and is detachably mounted, with screws 1003, to a smaller diameter portion 1004*g* formed at the rear end portion of the fixed tube 1004.

The smaller diameter portion 1004*g* serves to position and mount the lens barrel-side mount 1002 to the fixed tube 1004. The smaller diameter portion 1004*g* is formed by protrusion of a part of the internal periphery portion of the inner tube portion 1004*b*, and the internal diameter of the smaller diameter portion 1004*g* is smaller than the outermost dimension of the voice coil motors 1016, 1016' to be explained later. For this reason, the smaller diameter portion 1004*g* is provided with escape grooves 1004*h*, 1004*h*' for passing protruding portions 1013*a*, 1013*a*' of the voice coil motors 1016, 1016' at the assembling of the sliding tube 1009 and the voice coil motors 1016, 1016' into the inner tube portion 1004*b*.

The outer tube portion 1004*a* serves to rotatably support the focusing operation ring 1005 and the zooming operation ring 1006, to be explained later, about an optical axis L. On the internal periphery of the outer tube portion 1004*a*, there is provided, as shown in FIG. 1, an engaging portion 1004*j* for rotatably mounting the focusing ring 1005. On the external periphery of the outer tube portion 1004*a*, there are provided an engaging portion 1004*k* for rotatably mounting the zooming operation ring 1006 and a peripheral escape groove 1004*i*, penetrating through the engaging portion 1004*k* and provided therearound. The outer tube portion 1004*a* is integrally connected, at the end of the smaller diameter portion 1004*g* thereof, to a flange portion 1004*d* of the inner tube portion 1004*b*.

The focusing operation ring 1005 is to be manipulated in case of a focusing operation for focusing the image of an object on an image plane (not shown). On the external periphery of the focusing operation ring 1005, there is provided an engaging portion 1005*b* which slidably engages with the engaging portion 1004*j* of the outer tube portion 1004*a*, while the internal periphery of the focusing operation ring 1004 is provided with a key groove 1005*a* of a predetermined length, parallel to the optical axis L, to engage with a key projection 1011*b* to be explained later.

The zooming operation ring 1006 is to be manipulated in case the focal length is continuously varied in the image taking operation. On the internal periphery of the zooming operation ring 1006, there are provided an engaging portion 1006b for slidably engaging with the engaging portion 1004k of the outer tube portion 1004a and a projection 1006a which protrudes from the internal periphery, passes through the peripheral escape groove 1004i and engages with a recess 1007d of the zoom cam ring 1007.

The inner tube portion 1004b serves to rotatably support the zoom cam ring 1007, to be explained later, about the optical axis L, and to support the sliding tubes 1008, 1009, 1010 to be explained later, movably in the direction of the optical axis L. The inner tube portion 1004b is provided with penetrating straight grooves 1004c, 1004e, 1004f, parallel to the optical axis L, for guiding pins 1080, 1090, 1100 to be explained later. On the external periphery of the inner tube portion 1004b, there are provided engaging portions 1040a, 1040b for rotatably supporting the zoom cam ring 1007 and limiting the movement thereof in the direction of the optical axis L. On the internal periphery of the inner tube portion 1004b, there are provided escape grooves 1004h, 1004h' to be explained later. On the external periphery of the inner tube portion 1004b, there is fixed, with a screw 1021, a cover tube 1022 of which an end is supported by the flange 1004d. In the internal periphery of the inner tube portion 1004b, there is slidably fitted the sliding tube 1008 to be explained later.

The escape grooves 1004h, 1004h' are provided for passing the protruding portions 1013a, 1013a' of the voice coil motors 1016, 1016' when the sliding tube 1009, bearing the voice coil motors thereon, is inserted into the inner tube portion 1004b. These escape grooves 1004h, 1004h' also enable the zooming operation of the protruding portions 1013a, 1013a' along the optical axis L. As shown in FIG. 2, the escape grooves 1004h, 1004h' are formed by penetrating the internal periphery of the inner tube portion 1004b including the smaller diameter portion 1004g, parallel to the optical axis L, in positions respectively opposed to the protruding portions 1013a, 1013a' of the voice coil motors 1016, 1016'. The escape grooves 1004h, 1004h' are composed, as shown in FIG. 1, of a portion from the mounting face of the smaller diameter portion 1004g, where the lens barrel-side mount unit 1006 is mounted, to an initial position of the sliding tube 1009, and a portion in which the sliding tube 1009 moves in the zooming operation. In the first embodiment of the present invention, the escape grooves 1004h, 1004h' are formed, in the radial direction of the zoom cam ring 1007 supported by the external periphery of the inner tube portion 1004b and of the inner tube portion 1004b, in a partly overlapping manner (a range P in the direction of the optical axis L) across the inner tube portion 1004b.

The zoom cam ring 1007 serves to provide the pins 1080, 1090, 1100, to be explained later, with a driving force along the straight grooves 1004c, 1004e, 1004f. The zoom cam ring 1007 is provided with cam grooves 1007a, 1007b, 1007c, which are formed penetrating through the zoom cam ring 1007 in a direction skewed relative to the optical axis L and in which the pins 1080, 1090, 1100 are movably fitted, a notch 1007d formed at the end of the smaller diameter portion 1004g of the zoom cam ring 1007, and engaging portions 1071a, 1071b for slidably engaging with the engaging portions 1040a, 1040b of the inner tube portion 1004b. The zoom cam ring 1007 is rotatably supported on the external periphery of the inner tube portion 1004b.

The sliding tube 1008 serves to move the lens support frame 1011, to be explained later, in the direction of the optical axis L. The sliding tube 1008 is provided with escape grooves 1008a, 1008b which are formed parallel to the optical axis L and in which fitted are the pins 1090, 1100 to be explained later. The lens support frame 1024 is mounted, with screws 1023, to the end of the smaller diameter portion 1002g of the sliding tube 1008. On the external periphery of the sliding tube 1008, there are provided a pin mounting portion 1008d for mounting the pin 1080 to be explained later and a male helicoid screw portion 1008c at the front end side of the sliding tube 1008.

The pin 1080 moves along the straight groove 1004c and the cam groove 1007a, thereby moving the sliding tube 1008 along the optical axis L. The pin 1080 protrudes from the external periphery of the sliding tube 1008 and is movably fitted into the straight grooves 1004c and the cam groove 1007a.

The lens support frame 1011 serves to support the first lens group G1. On the internal periphery of the lens support frame 1011, there are provided a lens mounting portion 1011c protruding from the internal periphery and serving to mount the first lens group G1, and a female helicoid screw portion 1011a engaging with the male helicoid portion 1008c of the sliding tube 1008. On the external periphery of the lens support frame 1011, there is provided a key projection 1011b for engaging with the key groove 1005a of the focusing operation ring 1005.

The lens support frame 1024 serves to support the sixth lens group G6. On the internal periphery of the lens support frame 1024, there is provided a lens mounting portion 1024a for mounting the sixth lens group G6.

The sliding tube 1009 is a tubular member serving to support the diaphragm 1030, the third lens group G3, the fifth lens group G5, the vibration reducing lens G4 to be explained later and the voice coil motors (VCM) 1016, 1016' and to support the sliding tube 1010 to be explained later movably in the direction of the optical axis L. The sliding tube 1009 is provided with an escape groove 1009a formed parallel to the optical axis L and accepting the pin 1010 to be explained later, and a penetrating portion 1009d in which the vibration reducing lens frame 1012, to be explained later, penetrates so as to be movable in the vibration reducing operation. On the external periphery of the sliding tube 1009, there are provided a pin mounting portion 1009b for mounting the pin 1090 to be explained later, and housing portions 1009c, 1009c' formed at the side of the smaller diameter portion 1004g and serving to respectively house and support the voice coil motors 1016, 1016'. On the internal periphery of the sliding tube 1009, there are mounted the third lens group G3, the diaphragm 1030 positioned in front (at the object side) of the voice coil motors 1016, 1016', and the third and fifth lens groups G3, G5 respectively positioned in front of and behind the vibration reducing lens G4. On the internal periphery of the sliding tube 1019 there is provided an escape groove 1009e for passing a lever 1033a of the diaphragm 1030 to be explained later. Also on the internal periphery of the sliding tube 1009, there is slidably fitted the sliding tube 1010 to be explained later.

The voice coil motors 1016, 1016' serve to drive the vibration reducing lens frame 1012 by giving forces thereto, respectively in the x- and y-directions. The voice coil motors 1016, 1016' are mutually same in structure, except that the direction of force applied to the vibration reducing lens frame 1012 is different. As sown in FIGS. 1 and 2, the voice coil motor 1016 (1016') is composed of yokes 1015a (1015a'), 1013b (1015b') mounted in the housing portion 1009c (1009c') of the sliding tube 1009, permanent magnets 1014a, (1014a'), 1014b (1014b') respectively mounted on the yokes 1015a (1015a'), 1015b (1015b') for generating a magnetic field therebetween, and a coil 1013 (1013') consisting of plural turns of a conductive wire, positioned between the above-mentioned permanent magnets and mounted on the vibration reducing lens frame 1012. As shown in FIG. 1, the voice coil motors 1016, 1016' partly protrude from the external periphery of the sliding tube 1009. As shown in FIG. 2, the voice coil motors 1016, 1016' are positioned with an angular space of 90° with respect to the optical axis L. The outermost portions of the voice coil motors 1016, 1016' are protruding portions 1013a, 1013a', which protrude in the escape grooves 1004h, 1004h' formed on the internal periphery of the inner tube portion 1014b.

The diagram 1030 is composed of an iris mechanism for regulating the light beam and the light amount at the image taking operation. The diaphragm 1030 is provided with a fixed ring 1032 fixed to the sliding tube 1009, plural iris blades 1031 which are articulated, at an end thereof, to the fixed ring 1032, a rotary ring 1033 to which the other end of the iris blades is articulated, a lever 1033a, to be explained later, mounted on the rotary ring 1033, a rotary ring 1034 rotatably supported by the lens barrel-side mount member 1002, a lever 1034a, to be explained later, mounted on the rotary ring 1034, and a lever 1034b protruding backwards from the rotary ring 1034 and engaging with a control lever of the camera body (not shown).

The levers 1033a, 1034a serve to transmit the driving force for the diaphragm 1030 from the camera body, thereby linking the diaphragm 1030 with the camera body which controls the diaphragm 1030. The lever 1033a passes through the escape groove 1009e of the sliding tube 1009 and extends toward the lens barrel-side mount member 1002, parallel to the optical axis L. The lever 1034a engages with the lever 1033a and extends parallel to the optical axis L, toward the object side. As shown in FIG. 1, the levers 1033a, 1034a have such respective lengths that they can always mutually engage when the diaphragm 1030 moves in the direction of the optical axis L together with the sliding tube 1009, by the zooming operation. As shown in FIG. 2, the levers 1033a, 1034a are provided, in a gap portion S1 formed between the vibration reducing lens frame 1012 and the inner tube portion 1004b as will be explained later, in a position approximately opposed to the voice coil motors 1016, 1016'.

The vibration reducing lens frame 1012 serves to support the vibration reducing lens G4. On the external periphery of the vibration reducing lens frame 1012, there are provided coil mounting portions 1012y, 1012x in protruding manner, for respectively supporting the coils 1013, 1013' constituting a part of the voice coil motors 1016, 1016'. On the internal periphery of the vibration reducing lens frame 1012, there is provided a lens mounting portion 1012a for mounting the vibration reducing lens G4. The vibration reducing lens frame 1012 is supported by the sliding tube 1009 across a support member (not shown), so as to be movable by a predetermined amount in a direction perpendicular or substantially perpendicular to the optical axis. Gap portions S1, S2 are formed between the external periphery of the vibration reducing lens frame 1012 and the internal periphery of the inner tube portion 1004b, so as to cover the coil mounting portions 1012y, 1012x.

The sliding tube 1010 serves to support the second lens group G2. On the external periphery of the sliding tube 1010, there is provided, as shown in FIG. 1, a pin mounting portion 1010a for mounting the pin 1100 to be explained later, and, on the internal periphery of the sliding tube 1010, there is provided a lens mounting portion 1010b for mounting the second lens group G2.

The pins 1090, 1100 respectively move along the straight grooves 1004e, 1004f and the cam grooves 1007b, 1007c to move the sliding tubes 1009, 1010 in the direction of the optical axis L. The pin 1090 protrudes from the external periphery of the sliding tube 1009 and is movably fitted in the escape groove 1008a, the straight groove 1004e and the cam groove 1007b, while the pin 1100 protrudes from the external periphery of the sliding tube 1010 and is movably fitted in the escape groove 1009a, the straight groove 1004f and the cam groove 1007e.

In the following there will be explained the functions of the above-explained lens barrel, in each of the zooming operation, focusing operation, diaphragm stopping-down operation and vibration reducing operation.

(Zooming Operation)

When the photographer rotates the zooming operation ring 1006, the projection 1006a thereof pushes the notch 1007d of the zoom cam ring 1007 in a direction perpendicular to the plane of FIG. 1. The zoom can ring 1007 integrally rotates with the zooming operation ring 1006 about the optical axis L, whereby the pin 1090 moves in contact with a lateral face of the cam groove 1007b and is pushed thereby. The pin 1090, receiving a driving force, at the contact position with the lateral face of the cam groove 1007b, in a direction perpendicular thereto, moves in the direction of the optical axis L along the straight groove 1004e. As a result, the sliding tube 1009 bearing the pin 1090 moves, together with the voice coil motors 1016, 1016', the diaphragm 1030, the third and fifth lens groups G3, G5, the vibration reducing lens frame 1012 and the vibration reducing lens G4, from a position shown in FIG. 1 (hereinafter called initial position) in the direction along the optical axis L. In this operation, the projections 1013a, 1013a' of the coils 1013, 1013' move in the direction of the optical axis L, along the escape grooves 1004h, 1004h' formed on the internal periphery of the inner tube portion 1004b. Also the lens support frame 1024 supporting the sixth lens group G6 moves integrally with the sliding tube 1009, in the direction of the optical axis L.

Also as a result of the rotation of the zoom cam ring 1007, the pins 1080, 1100 are respectively pushed by the lateral faces of the cam grooves 1007a, 1007c. By the driving forces at the contact positions with the lateral faces of the cam grooves 1007a, 1007c, the pins 1080, 1100 respectively move along the straight grooves 1004c, 1004f. As a result, the sliding tubes 1008, 1009 respectively bearing the pins 1080, 1100 move in the direction of the optical axis L. The sliding tube 1008 and the lens support frame 1011 are mutually coupled by the engagement of the male helicoid portion 1008c and the female helicoid portion 1011a. Consequently, when the sliding tube 1008 is moved, the lens support frame 1011 is guided by the key groove 1005a engaging with the key projection 1011b and moves in the direction of the optical axis L.

A zooming operation is thus achieved by the movement, in the direction of the optical axis L, of the first lens group G1, the second lens group G2, the diaphragm 1030, the third lens group G3, the vibration reducing lens G4, the fifth lens group G5 and the sixth lens group G6. The focal length can be adjusted by the direction and angle of rotation of the zooming operation ring 1006.

(Focusing Operation)

When the photographer rotates the focusing operation ring 1005, a longitudinal lateral face of the key groove 1005a pushes the key projection 1011b, whereby the lens support frame 1011 tends to rotate about the optical axis L. The lens support frame 1011 is coupled, by the engagement of the male helicoid screw portion 1008c and the female helicoid screw portion 1011a, with the sliding tube 1008, of which pin 1080 can only move along the straight groove 1004e. Consequently the sliding tube 1008 cannot rotate, and the lens support frame 1011 rotates and moves in the direction of the optical axis L, under the engagement between the female helicoid screw portion 1011a and the male helicoid screw portion 1008c of the sliding tube 1008.

A focusing operation can thus be achieved by the movement of the first lens group G1 in the direction of the optical axis L. The focus state can be adjusted by the direction and amount of rotation of the focusing operation ring 1005.

(Diaphragm Stopping-Down Operation)

When the control lever of the camera body (not shown) is moved by a predetermined amount, the lever 1034b engaging therewith rotates the rotary ring 1034. As shown in FIG. 2, the lever 1033a is fitted in a recess of the lever 1034a. Thus, upon rotation of the rotary ring 1034, the lever 1034a moves to a broken-lined position shown in FIG. 2, integrally with the lever 1033a. As a result, the lever 1033a rotates the rotary ring 1033, whereby the iris blades 1031 respectively change position to vary the diameter of the diaphragm aperture.

(Vibration Reducing Operation)

A vibration sensor, provided in the lens barrel 1001 or the camera body on which the lens barrel 1001 is mounted, detects the vibration generated in the lens barrel 1001 and the camera body. A CPU provided in the lens barrel 1001 or the camera body receives the output signal of the vibration sensor and calculates the driving amount of the vibration reducing lens G4 required for canceling the vibration. The CPU controls a drive circuit (not shown), thereby regulating a current, supplied from a power source, to an amount corresponding to the drive amount. The regulated current is supplied to the coils 1013, 1013' of the voice coil motors 1016, 1016' to generate electromagnetic forces therein, by the magnetic fields between the yokes 1015a, 1015a' and 1015b, 1015b'. As a result, the vibration reducing lens frame 1012 is driven by a predetermined amount in the direction perpendicular to the optical axis, and the vibration is reduced by the fourth lens group G4. The direction and amount of drive of the vibration reducing lens frame 1012 is determined by the direction and magnitude of the electromagnetic forces generated in the voice coil motors 1016, 1016'. The direction and amount of drive of the vibration reducing lens frame 1012 can be varied by controlling the currents supplied to the coils 1013, 1013' and the magnetic fields.

In the first embodiment of the present invention, the levers 1033a, 1034a of the diaphragm 1030 are positioned in the gap portion S1, which is approximately opposed to the voice coil motors 1016, 1016' as shown in FIG. 2. Consequently, in case the vibration reducing apparatus has a structure in which the voice coil motors 1016, 1016' protrude from the external periphery of the vibration reducing lens frame 1012 and in case the diaphragm 1030 is positioned in front (object side) of the voice coil motors 1016, 1016', it is possible to prevent the mutual interference between the voice coil motors 1016, 1016' and the levers 1033a, 1034a. Thus, as the levers 1033a, 1034a need not be positioned outside the voice coil motors 1016, 1016', it is rendered possible to reduce the external diameter of the lens barrel 1001, thus achieving compactization thereof. Also the inner tube portion 1004b of the lens barrel 1001 need not be provided therein with a housing space or an escape groove for the levers 1033a, 1034a, it is rendered possible to reduce the working cost of such inner tube portion and to avoid loss of the rigidity of the lens barrel.

In the first embodiment of the present invention, the zoom cam ring 1007 is provided on the external periphery of the inner tube portion 1004b and the sliding tube 1009 is provided inside the internal periphery of the inner tube portion 1004b. It is therefore possible to avoid an enlargement of the internal diameter of the zoom cam ring 1007, for the purpose of preventing the mutual interference between a part of the voice coil motors 1016, 1016' and the zoom cam ring 1007, thereby suppressing the radial length of the lens barrel 1001. Also in the first embodiment of the present invention, the internal periphery of the inner tube portion 1004b is provided with the escape grooves 1004h, 1004h' for passing the protruding portions 1013a, 1013a' of the coils 1013, 1013'. It is therefore possible to further reduce the radial dimension of the lens barrel 1001. Furthermore, according to the first embodiment of the present invention, the zoom cam ring 1007 and the escape grooves 1004h, 1004h' are provided in an overlapping manner (range P in FIG. 1) across the inner tube portion 1004b in the radial direction thereof. For this reason, the lens barrel 1001 can be reduced also in the length along the optical axis L.

[Second Embodiment]

Figure 3:
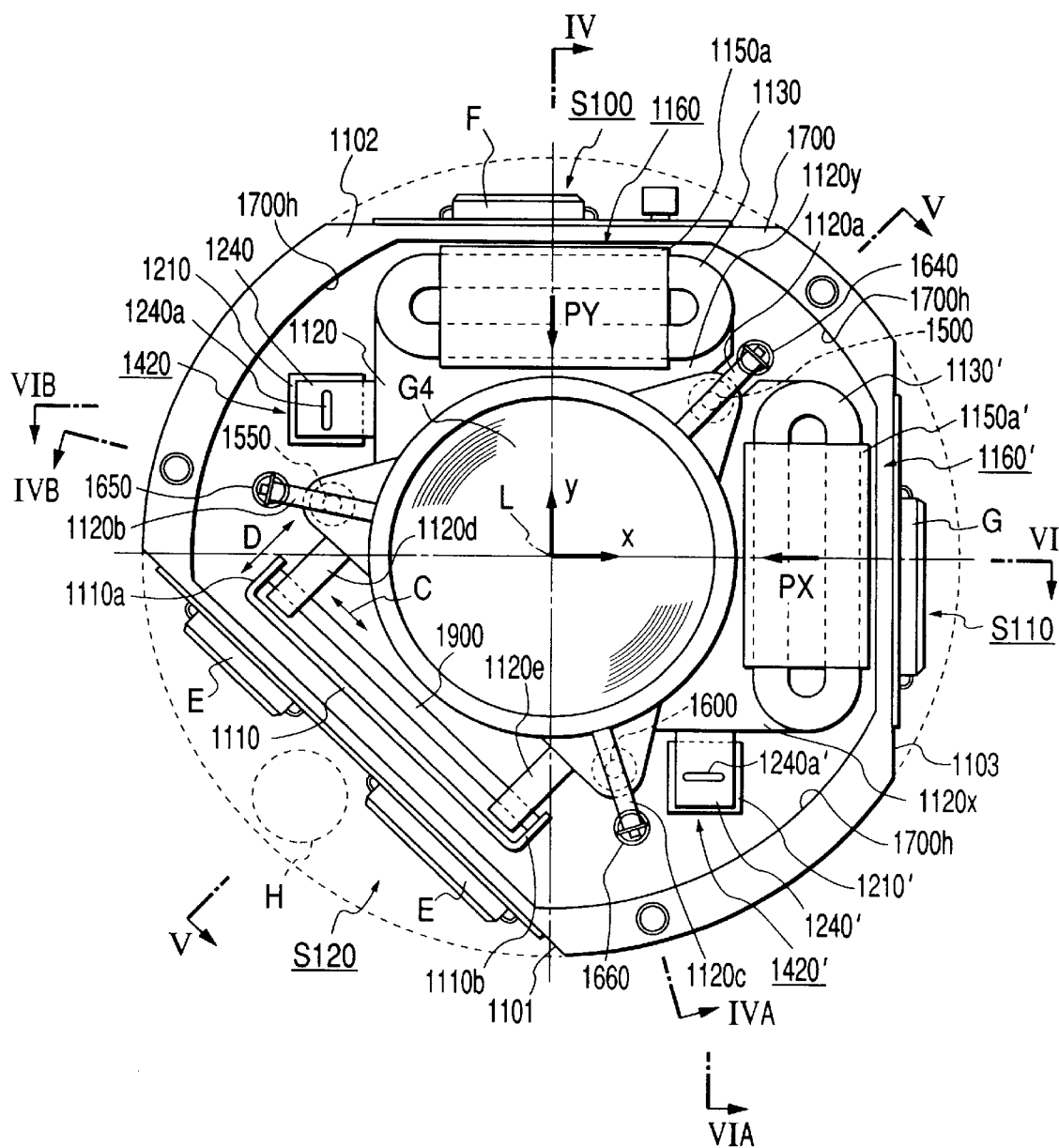
FIG. 3 is a sectional view of a vibration reducing apparatus constituting a second embodiment of the present invention.
Figure 4:
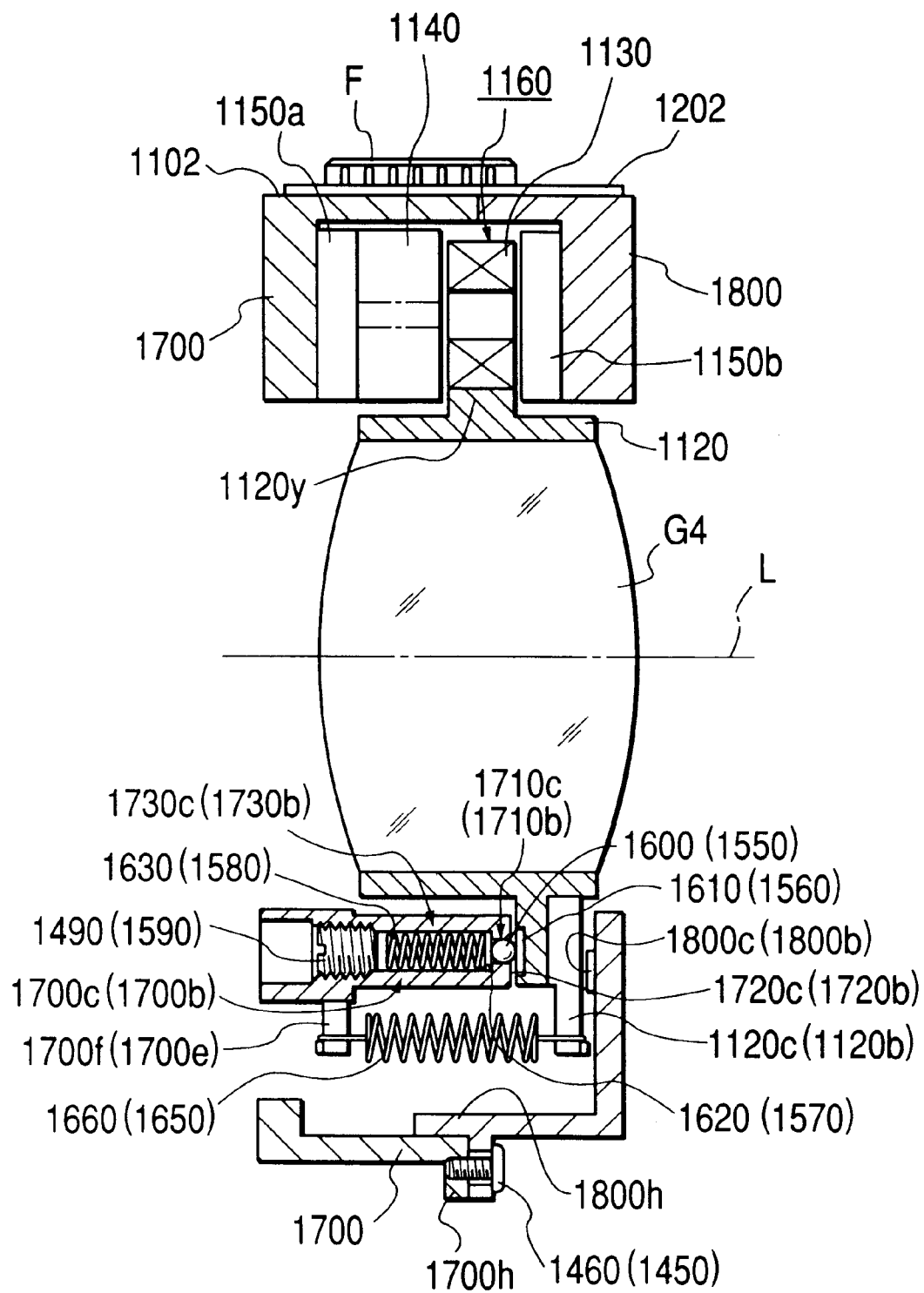
FIG. 4 is a sectional view taken along a line IV–IVA in FIG. 3.
Figure 5:
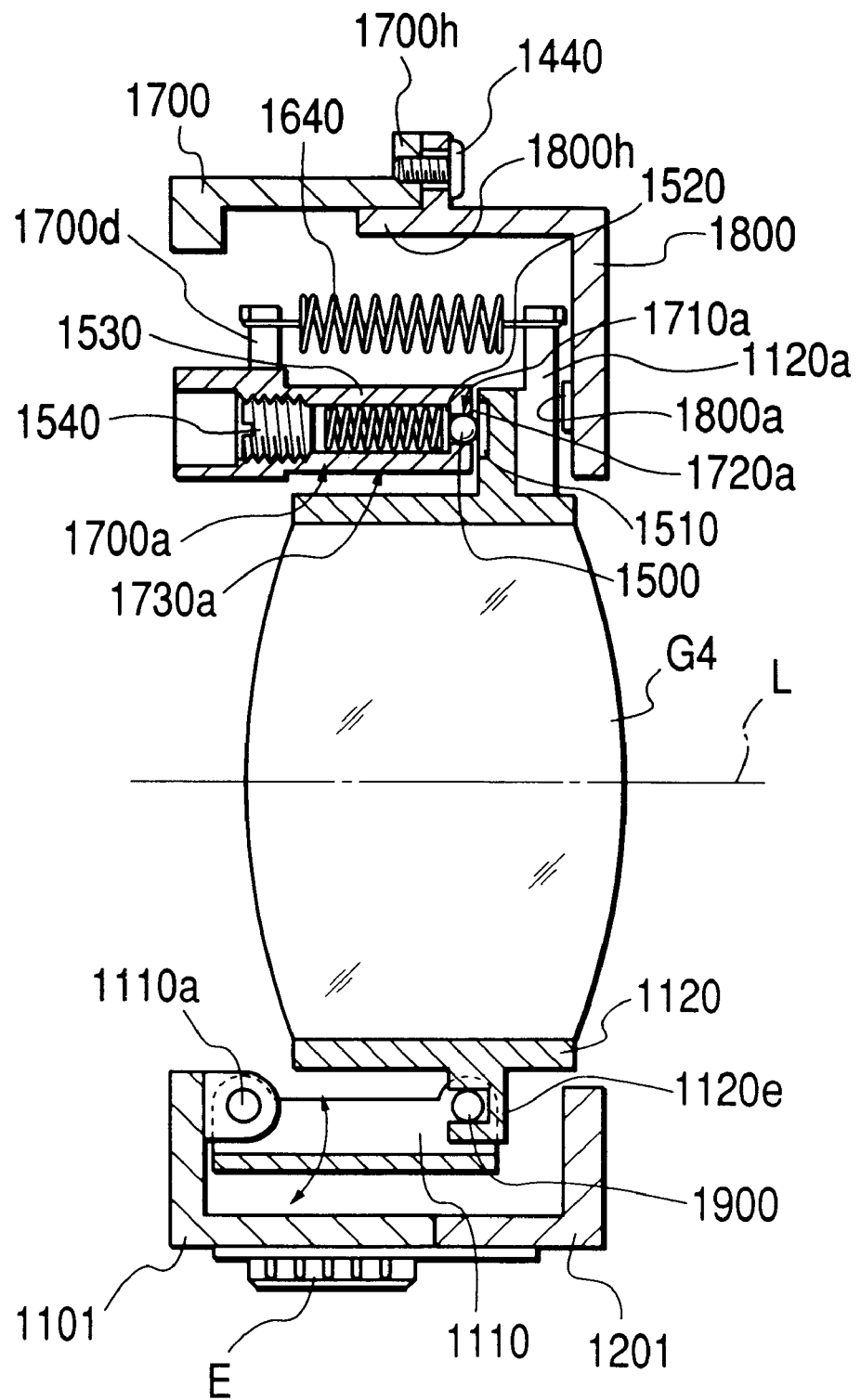
FIG. 5 is a sectional view taken along a line V—V in FIG. 3.
Figure 6:
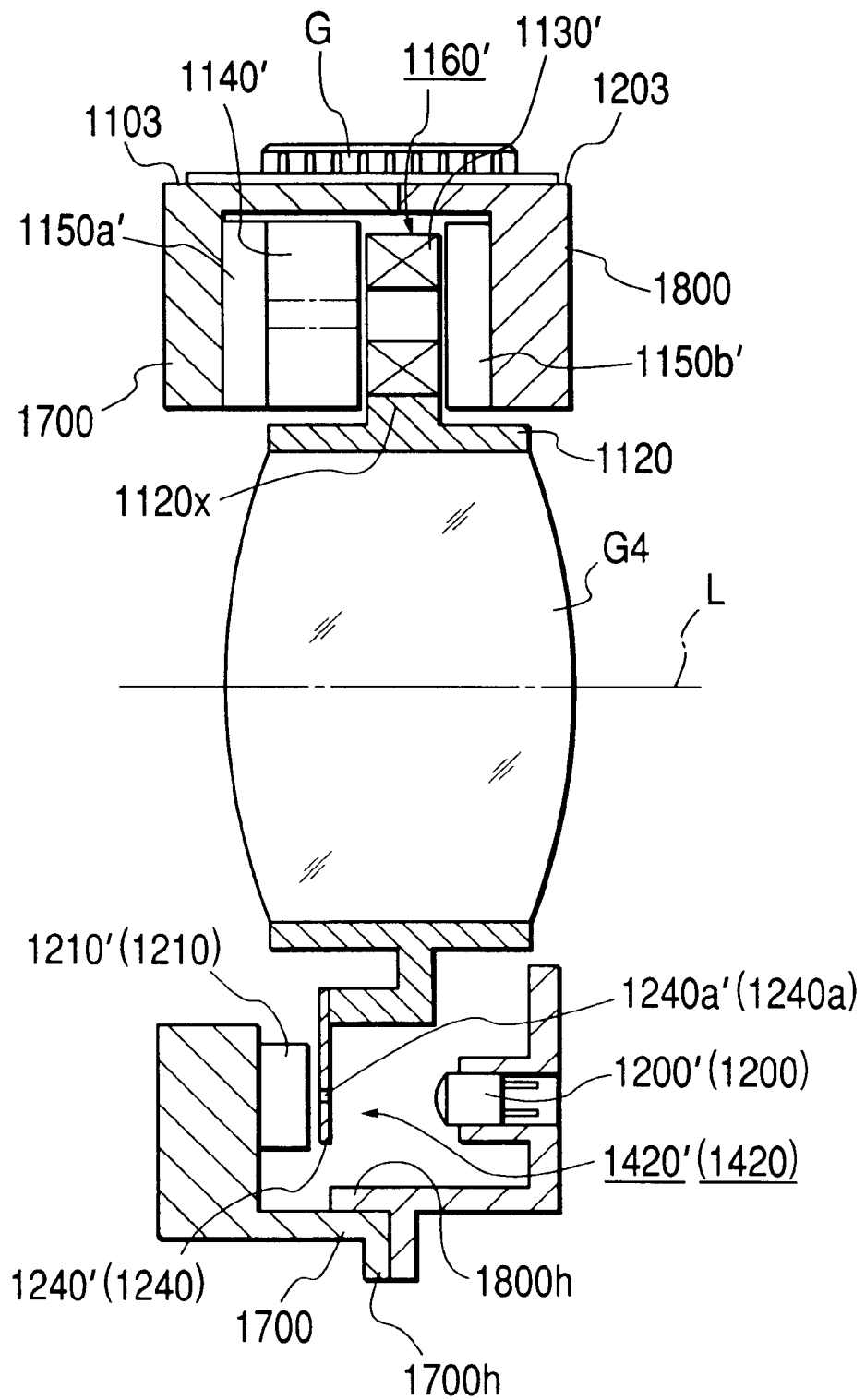
FIG. 6 is a sectional view taken along a line VI–VIA in FIG. 3.

FIG. 3 is a sectional view of a vibration reducing apparatus constituting a second embodiment of the present invention, while FIG. 4 is a sectional view taken along a line IV–IVA in FIG. 3, FIG. 5 is a sectional view taken along a line V—V in FIG. 3, and FIG. 6 is a sectional view taken along a line VI–VIA in FIG. 3. The members shown in the cross section along a lien IV–IVB in FIG. 3 are represented by parenthesized numbers in FIG. 4. Also the members shown in the cross section along a lien VI–VIB in FIG. 3 are represented by parenthesized numbers in FIG. 6 .

A vibration reducing lens frame 1120 is provided, as shown in FIGS. 3 and 6, with slit members 1240, 1240' positioned on a plane perpendicular to the optical axis as will be explained later, and, as shown in FIGS. 4 and 5, steel ball receiving members 1510, 1560, 1610 at the side of steel ball receiving portions 1700a, 1700b, 1700c to be explained later. On the external periphery of the vibration reducing lens frame 1120, there are provided, as shown in FIG. 3, spring support portions 1120a, 1120b, 1120c and hooks 1120d, 1120e, and, as shown in FIGS. 4 and 6, coil mounting portions 1120y, 1120x in protruding manner for respectively mounting coils 1130, 1130' of voice coil motors 1160, 1160' to be explained later.

The steel ball receiving members 1510, 1560, 1610 serve to guide the movement of the vibration reducing lens frame 1120 in a direction perpendicular or substantially perpendicular to the optical axis L. As shown in FIGS. 4 and 5, these members are in contact with steel balls 1500, 1550, 1600 for allowing smooth movement of the vibration reducing lens frame 1120. These members are formed of a metal harder than the steel balls 1500, 1550, 1600. The steel ball receiving members 1510, 1560, 1610 are preferably provided with a flat surface, in order to realize facial contact with end faces 1720a, 1720b, 1720c of the steel ball receiving portions 1700a, 1700b, 1700c to be explained later.

Springs 1640, 1650, 1660 serve to support the vibration reducing lens frame 1120 movably with respect to a base member 1700, and to bias the vibration reducing lens frame 1120 toward the steel balls 1500, 1550, 1600. The springs 1640, 1650, 1660 are mounted, at an end thereof, respectively on the spring support portions 1120a, 1120b, 1120c, and, at the other end, respectively on spring support portions 1700d, 1700e, 1700f to be explained later.

The base member 1700 is a casing member for housing the vibration reducing lens G4, the vibration reducing lens frame 1120 and a driving mechanism composed for example of the voice coil motors 1160, 1160', a guide shaft 1900, the springs 1640, 1650, 1660 etc. The base member 1700 is provided, as shown in FIGS. 4 and 5, with the steel ball receiving portions 1700a, 1700b, 1700c, the spring support portions 1700d, 1700e, 1700f and a shaft 1110c, and, as shown in FIGS. 4 and 6, yokes 1150a, 1150' of the voice coil motors 1160, 1160' and photosensors (PSD) 1210, 1210' of position sensors 1420, 1420'. On the external periphery of the base member 1700, there are provided, as shown in FIGS. 3 to 6, flat portions 1101, 1102, 1103 to be explained later and an engaging portion 1700h.

The flat portions 1101, 1102, 1103 are so formed as to cut off parts of the external periphery of the base member 1700. As shown in FIG. 3, the flat portions 1101, 1102, 1103 are so formed as to eliminate dead space portions (broken-lined portions in FIG. 3), from the originally cylindrical external periphery of the base member 1700. The flat portion 1101 is positioned close to the guide shaft 1900 and a guide arm 1110 and parallel or substantially parallel thereto. The flat portion 1102 is positioned close to a coil 1130, a permanent magnet 1140 and a yoke 1150a, and parallel or substantially parallel thereto. The flat portion 1103 is positioned close to a coil 1130', a permanent magnet 1140' and a yoke 1150a', and parallel or substantially parallel thereto. Mounted electric components E, F, G that cannot be mounted on a cylindrical surface such as of the inner tube portion 1004b or the base member 1700 can be mounted on such flat surfaced portions 1101, 1102, 1103. As shown in FIGS. 4 and 5, the flat portions 1101, 1102, 1103 have a thickness with sufficient strength, to the internal periphery of the base member 1700.

A protective member 1800 is a casing member for protecting, together with the base member 1700, the driving mechanism composed of, for example, the vibration reducing lens G4, the vibration reducing lens frame 1120 and the voice coil motors 1160, 1160'. The protective member 1800 is provided, as shown in FIGS. 4 and 6, with yokes 1150b, 1150b' of the voice coil motors 1160, 1160', and light emitting elements (LED) 1200, 1200' of position sensors 1420, 1420', and, as shown in FIGS. 4 and 5, with lens frame receiving members 1800a, 1800b, 1800c. On the external periphery of the protective member 1800, there are provided, as shown in FIGS. 4 to 6, the flat portions 1201, 1202, 1203 and an engaging portion 1800h.

Flat portions 1201, 1202, 1203 are so formed as to cut off parts of the external periphery of the protective member 1800. As shown in FIG. 3, the flat portions 1201, 1202, 1203 are so formed as to eliminate dead space portions from the originally cylindrical external periphery of the protective member 1800. The flat portions 1201, 1202, 1203 are so formed as to be co-planar or substantially co-planar respectively with the flat portions 1101, 1102, 1103 of the base member 1700. When the vibration reducing apparatus housed by the base member 1700 and the protective member 1800 is incorporated in the inner tube member 1004b, the flat portions 1201, 1202, 1203 together with the flat portions 1101, 1102, 1103 form gap portions S100, S200, S300 as spaces to the inner tube portion 1004b. These gap portions S100, S200, S300 can be utiliszed as escaping spaces not only for the levers 1032a, 1034a shown in FIGS. 1 and 2, but also for an axially extended component H such as an AF actuator for generating the driving force for driving the first lens group Gl, shown in FIG. 1, in the direction of the optical axis L. Also as shown in FIGS. 3 to 6, mounted electric components E, F, G may be mounted on the flat portions 1201, 1202, 1203 as in the case of the flat portions 1101, 1102, 1103. As shown in FIGS. 4 and 5, the flat portions 1201, 1202, 1203 have a thickness with sufficient strength, to the internal periphery of the base member 1700.

Lens frame receiving portions 1800a, 1800b, 1800c serve to receive the vibration reducing lens frame 1120 in case of a movement thereof to the right in FIGS. 4 and 5, and to limit the movement thereof within a predetermined range. The lens frame receiving portions 1800a, 1800b, 1800c are formed on the protective member 1800, at the side of the vibration reducing lens frame 1120, and preferably formed with a flat surface, in order to realize facial contact with the vibration reducing lens frame 1120. The distance between the lens frame receiving portions 1800a, 1800b, 1800c and the vibration reducing lens frame 1120 is preferably so selected that the steel balls 1500, 1550, 1600 do not fall off from the steel ball receiving portions 1710a, 1710b, 1710c when the steel ball receiving members 1510, 1560, 1610 are separated from the end faces 1720a, 1720b, 1720c.

Engaging portions 1700h, 1800h serve, when mutually fitted, to maintain the relative positional relationship of the base member 1700 and the protective member 1800. The engaging portion 1700h is formed on the external periphery of the base member 1700, while the engaging portion 1800h is formed on the external periphery of the protective member 1800. The engaging portions 1700h, 1800h are maintained in the mutually engaged state by fixing screws 1440, 1450, 1460 in a direction parallel to the optical axis L (thrust direction).

A guide shaft 1900 serves to guide the vibration reducing lens frame 1120 in the movement thereof in a direction perpendicular to substantially perpendicular to the optical axis L. The guide shaft 1900 is provided in a direction C, forming a non-regular angle with the x- or y-direction in FIG. 3. The guide shaft 1900 engages, movably in the direction C, with the hooks 1120d, 1120e of the vibration reducing lens frame 1120.

A guide arm 1110 serves to move the vibration reducing lens frame 1120 in a direction parallel to the guiding direction C of the guide shaft 1900. The guide arm 1110 is provided, on both ends thereof, with bent portions 1110a, 1110b which rotatably support the guide shaft 1900. As shown in FIG. 5, the guide arm 1110 is supported, at the side of the base member 1700, rotatably in a direction indicated by an arrow, with respect to a shaft 1110c. The rotation of the guide arm 1110 allows the vibration reducing lens frame 1120 to move in a direction D perpendicular to the guiding direction C of the guide shaft 1900.

The voice coil motors 1160, 1160' serve to drive the vibration reducing lens frame 1120 by providing the same respectively with forces in the y- and x-directions. These motors are same in structure, except in the difference in the direction of force given to the vibration reducing lens frame 1120. As shown in FIG. 4, the voice coil motor 1160 is composed of a yoke 1150b mounted on the protective member 1800 at the side of the vibration reducing lens frame 1120, a permanent magnet 1140 for generating a magnetic field in the space to the yoke 1150b, a coil 1130 positioned between the yoke 1150b and the permanent magnet 1140 and mounted on the vibration reducing lens frame 1120, and a yoke 1150a supporting the permanent magnet 1140 and mounted on the base member 1700 at the side of the vibration reducing lens frame 1120. In response to a current supply to the coil 1130, the vibration reducing lens G4 is driven by a downward force PY along the y-direction, and, in response to an inverse current supply to the coil 1130, the vibration reducing lens G4 is driven in the opposite (upward) direction.

Position sensors 1420, 1420' serve to respectively detect the positions in the y- and x-directions of the vibration reducing lens G4. As these sensors are mutually same in the structure, the following explanation will be given on the sensor 1420 with reference to FIG. 6. The position sensor 1420 is composed of a light emitting element 1200 mounted on the protective member 1800 at the side of the vibration reducing lens frame 1120, a photosensor 1210 mounted on the base member 1700 at the side of the vibration reducing lens frame 1120, a slit member 1240 positioned between the light emitting element 1200 and the photosensor 1210, and a slit 1240a formed on the slit member 1240. The light emitted from the light emitting element 1200 is transmitted by the slit 1240a and reaches the photosensor 1210. With a movement of the slit 1240a, the position of the light transmitted by the slit 1240a and reaching the photosensor 1210 is changed. Such change in the light position varies the output signal of the photosensor 1210, so that the y-position of the vibration reducing lens G4 can be detected from such change in the output signal.

The steel ball receiving portions 1700a, 1700b, 1700c serve to support the steel balls 1500, 1550, 1600, and have a same structure, as shown in FIGS. 4 and 5. The steel ball housing portion 1710a is mounted, as shown in FIG. 5, on the base member 1700 at the side of the vibration reducing lens frame 1120, in a protruding manner thereto. The steel ball housing portion 1700a is provided with a steel ball housing portion 1710a, an end face 1720a, and a compression spring housing portion 1730a.

The compression spring receiving portion 1730a serves to house a steel ball receiving member 1520, and a compression spring 1530 for biasing the steel ball receiving member 1520 toward the vibration reducing lens frame 1120. In this portion 1730a, the steel ball receiving member 1520 and the compression spring 1530 are fixed with a screw 1540.

The steel ball receiving member 1520 serves to receive the steel ball 1500 in contact therewith. It is formed with a harder metal than the steel ball 1500, preferably with a flat shape in order to realize a point contact with a steel ball 1500.

The steel ball housing portion 1710a serves to house the steel ball 1500 in a state slightly protruding from the end face 1720a, and is formed in a range from the bottom of the compression spring housing portion 1730a to the end face 1720a. As the steel ball housing portion 1710a has an internal diameter smaller than that of the compression spring housing portion 1730a, the steel ball receiving member 1520 does not jump out from the compression spring housing portion 1730a under the pressure of the compression spring 1530.

The end face 1720a serves as a guide member for receiving the vibration reducing lens frame 1120 in the leftward movement thereof, and is preferably formed with a flat surface, in order to realize a facial contact with the steel ball receiving member 1510.

In the following there will be explained the functions of the vibration reducing apparatus of the second embodiment of the present invention.

In a state shown in FIG. 3, the vibration reducing lens frame 1120 cannot rotate about the optical axis L because of the engagement of the hook 1120d thereof with the guide shaft 1900. The vibration reducing lens frame 1120 receives a downward force PY, along the y-direction, from the voice coil motor 1160, thereby moving on the guide shaft 1900 toward the lower right-hand side. The guide arm 1110, receiving the force PY, rotates clockwise about the shaft 1110c as shown in FIG. 5. The rotation of the guide arm 1110 causes a parallel displacement of the guide shaft 1900 in a direction (direction D in the drawing) perpendicular to the longitudinal direction thereof. The vibration reducing lens frame 1120, being inhibited by the steel balls 1500, 1550, 1600 from the movement in the axial direction, moves in the y- and x-directions together with the vibration reducing lens G4, which thus moves in a direction which is skewed relative to the optical axis L, thereby reducing the vibration. On the other hand, if the vibration reducing lens frame 1120 receives a leftward force from the voice coil motor 1160' along the x-direction in the state shown in FIG. 3, the frame 1120 moves on the guide shaft 1900 in a direction toward upper left, and the guide shaft 1900 conducts a parallel displacement in the direction D perpendicular to the longitudinal direction thereof. Consequently the vibration reducing lens frame 1120 can move an arbitrary position in the plane perpendicular to the optical axis L.

Hooks 1120d, 1120e engage with the guide shaft 1900 in such a manner that they can slightly move in the direction of the optical axis L. In the state shown in FIGS. 4 and 5, if a leftward impact force is applied to the vibration reducing lens frame 1120, it starts to move toward the left. As a result, the steel ball receiving members 1510, 1560, 1610, 1520, 1570, 1620 receive the impact force in concentrated manner at the contact points with the steel balls 1500, 1550, 1600. The steel ball receiving members 1510, 1560, 1610 push the steel balls 1500, 1550, 1600 and the steel ball receiving members 1510, 1560, 1610 to the left, thereby compressing the springs 1530, 1580, 1630, which absorb the impact force, whereby the impact force at the contact points between the steel ball receiving members 1510, 1560, 1610, 1520, 1570, 1620 and the steel balls 1500, 1550, 1600 is relaxed and no dents (impact recesses) are formed at these contact points.

However, if the impact force applied to the vibration reducing lens frame 1120 exceeds a predetermined value, the end faces 1720a, 1720b, 1720c impinge on the steel ball receiving members 1510, 1560, 1610 thereby stopping the vibration reducing lens frame 1120. Since the steel ball receiving members 1510, 1560, 1610 are in facial contact with the end faces 1720a, 1720b, 1720c, no dents (impact recesses) are formed at the contact points. The steel ball receiving members 1510, 1560, 1610 and the steel ball receiving members 1520, 1570, 1620 sandwich the steel balls 1500, 1550, 1600 by the biasing force of the springs 1640, 1650, 1660. Consequently the steel balls 1500, 1550, 1600 do not fall off from the steel ball housing portions 1710a, 1710b, 1710c even when the vibration reducing lens frame 1120 moves to the left.

In the state shown in FIGS. 4 and 5, if a rightward impact force is applied to the vibration reducing lens frame 1120, it starts to move toward the right against the biasing force of the springs 1640, 1650, 1660. In this state, the steel ball receiving members 1510, 1560, 1610 and those 1520, 1570, 1620 move in mutually separating directions. If the impact force is small, it is absorbed by the springs 1530, 1580, 1630, but, if the impact force is large, the lens frame receiving portions 1800a, 1800b, 1800c stop the vibration reducing lens frame 1210. Since the vibration reducing lens frame 1210 is in contact with the lens frame receiving portions 1800a, 1800b, 1800c, the steel balls 1500, 1550, 1600 do not fall off from the steel ball housing portions 1710a, 1710b, 1710c.

In the second embodiment of the present invention, the vibration reducing apparatus is formed as a unit by the base member 1700, constituting the casing member, and the protective member 1800. It is therefore possible to efficiently install the vibration reducing unit into the limited space inside the inner tube member 1004b. Also in the second embodiment of the present invention, flat portions 1101, 1102, 1103, 1201, 1202, 1203 are so formed on the base member 1700 and the protective member 1800 in such a manner as to eliminate the dead space around the external periphery. It is therefore rendered possible to reduce the size and weight of the vibration reducing unit, and to facilitate the assembling operation of the vibration reducing unit into the lens barrel.

In the second embodiment of the present invention, the components E, F, G for controlling the voice coil motors 1160, 1160' can be mounted on the flat portions 1101, 1102, 1103, 1201, 1202, 1203. It is therefore no longer necessary to mount other controlling components, separate from the vibration reducing unit, on the lens barrel side, or to connect the vibration reducing unit and such components with lead wires or flexible printed circuit boards. The vibration reducing unit, already incorporating the controlling components, can be installed into the inner tube portion 1004b so that the work efficiency can be improved. Also in the second embodiment of the present invention, the flat portions 1101, 1102, 1103, 1201, 1202, 1203 can be formed close to the position sensors 1420, 1420' including the photosensors (PSD) 1210, 1210', and the voice coil motors 1160, 1160'. For this reason, an amplifier for amplifying the weak output voltage of the photosensors 1210, 1210' can be provided close thereto.

In a vibration reducing apparatus in which an annular substrate bearing controlling components such as the voice coil motors is so positioned as to be skewed relative to the optical path at the object side, such substrate becomes an obstacle when the front lens group is brought close by the zooming operation. Also the light entering the front lens group may be reflected by such substrate, thereby generating flare or ghost image. In the second embodiment of the present invention, the flat portions 1101, 1102, 1103, 1201, 1202, 1203 are formed on the external periphery of the base member 1700 and the protective member 1800, distant from the light path. For this reason, no obstacle is posed by the substrate even when the front lens group is brought close to the vibration reducing lens by zooming operation, and the generation of flare or ghost image can be prevented since the incoming light is not reflected by the substrate.

In the first and second embodiments of the present invention, the axially movable first lens group G1 and the diaphragm 1030 are positioned in front of the vibration reducing lens G4. In these embodiments, the AF actuator for driving the first lens group G1, the shaft for transmitting the driving force from the camera body 1001, the levers 1033a, 1034a for transmitting the driving force from the camera body 1001 to the diaphragm 1030 etc. can be housed or passed in a similar manner as the component H shown in FIG. 3. Furthermore, in the second embodiment of the present invention, if the vibration reducing units does not move in the direction of the optical axis L, the AF actuator can be mounted on the flat portion of the vibration reducing unit.

In the foregoing first and second embodiments, the components constituting the driving mechanism for driving the vibration reducing lens frame 1012, 1120 have been exemplified by the voice coil motors 1016, 1016', 1160, 1160', but such example is not restrictive. For example, such components may also be composed of small rod-shaped ultrasonic motors or DC motors. Also the drive source for driving the first lens group G1 in the focusing operation or for driving the diaphragm 1130 can be composed, for example, of a small rod-shaped ultrasonic motor or a DC motor.

[Third Embodiment]

Figure 7:
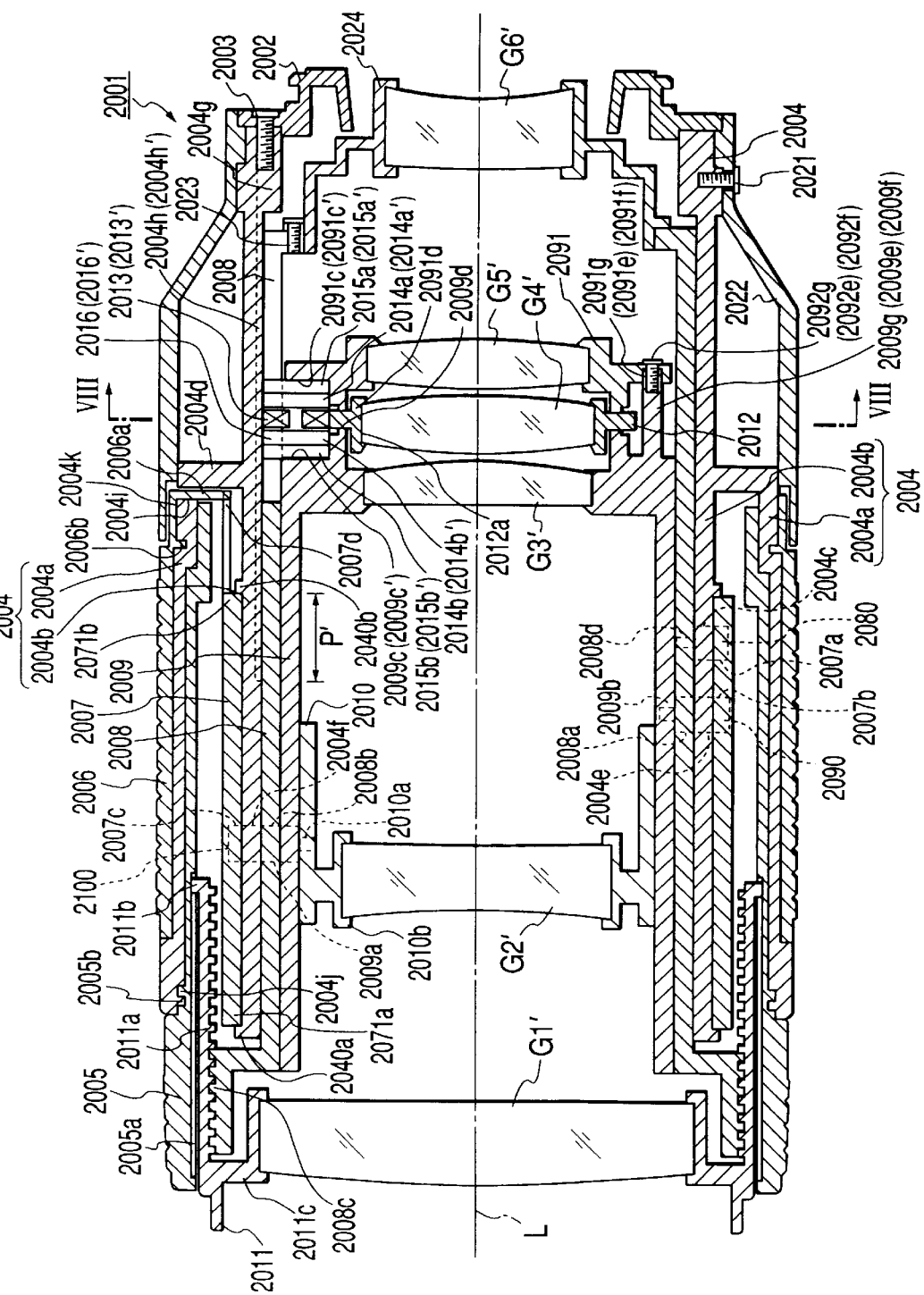
FIG. 7 is a sectional view of a lens barrel constituting a third embodiment of the present invention.
Figure 8:
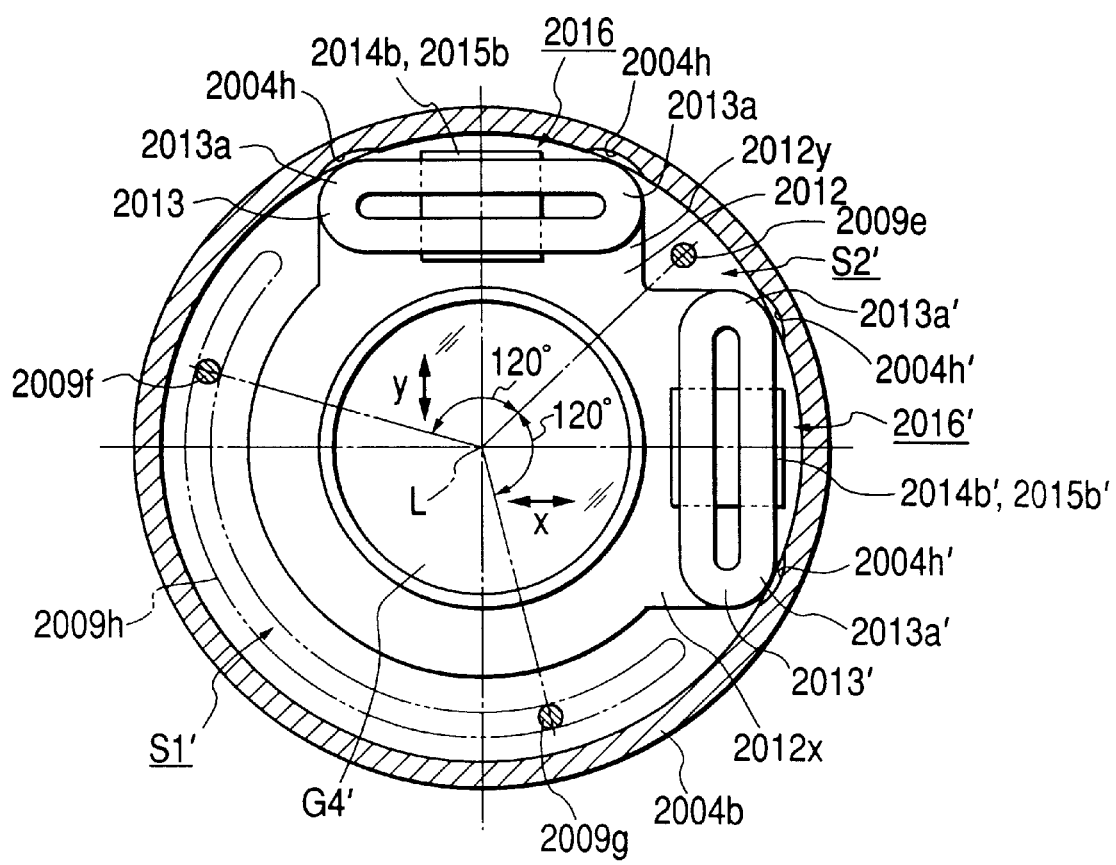
FIG. 8 is a sectional view taken along a line VIII—VIII in FIG. 7.

FIG. 7 is a sectional view of a lens barrel constituting a third embodiment of the present invention, and FIG. 8 is a sectional view taken along a line VIII—VIII in FIG. 7.

In FIG. 7, an escape groove 2004h', a housing portion 2009c', rod-shaped projections 2009e, 2009f, holes 2019e, 2019f, screws 2092e, 2092f and a voice coil motor 2016' are omitted from the illustration and the reference numbers are indicated with parentheses.

The lens barrel 2001 is composed of a first lens group G1', a second lens group G2', a third lens group G3', a fourth lens group (vibration reducing lens) G4', a fifth lens group G5' and a sixth lens group G6' constituting an image taking optical system; lens support frames 2011, 2024, a sliding tube 2010, a vibration reducing lens frame 2012, sliding tubes 2008, 2009, a fixed tube 2004 consisting of an outer tube portion 2004a and an inner tube portion 2004b, a zoom cam ring 2007 rotatably supported between the outer tube portion 2004a and the inner tube portion 2004b, a zooming operation ring 2006 for rotating the zoom cam ring 1007, and a focusing operation ring 2005 for driving the lens support frame 1011.

A mount member 2002 of the lens barrel side detachably engages with a mount unit of the camera body side, provided in a camera body (not shown). The lens barrel side mount member 2002 rotatably supports a rotary ring 1034, and is detachably mounted, with screws 2003, to a smaller diameter portion 2004g formed at the rear end portion of the fixed tube 2004.

The smaller diameter portion 2004g serves to position and mount the lens barrel-side mount 2002 to the fixed tube 2004. The smaller diameter portion 2004g is formed by protrusion of a part of the internal periphery portion of the inner tube portion 2004b, and the internal diameter of the smaller diameter portion 2004g is smaller than the outermost dimension of the voice coil motors 2016, 2016' to be explained later. For this reason, the smaller diameter portion 2004g is provided with escape grooves 2004h, 2004h' for passing protruding portions 2013a, 2013a' of the voice coil motors 2016, 2016' at the assembling of the sliding tube 2009 and the voice coil motors 2016, 2016' into the inner tube portion 2004b.

The outer tube portion 2004a serves to rotatably support the focusing operation ring 2005 and the zooming operation ring 2006, to be explained later, about the optical axis L. On the internal periphery of the outer tube portion 2004a, there is provided, as shown in FIG. 1, an engaging portion 2004j for rotatably mounting the focusing ring 2005. On the external periphery of the outer tube portion 2004a, there are provided an engaging portion 2004k for rotatably mounting the zooming operation ring 2006 and a peripheral escape groove 2004i, penetrating through the engaging portion 2004k and provided therearound. The outer tube portion 2004a is integrally connected, at the end of the smaller diameter portion 2004g thereof, to a flange portion 2004d of the inner tube portion 2004b.

The focusing operation ring 2005 is to be manipulated in case of a focusing operation for focusing the image of an object on an image plane (not shown). On the external periphery of the focusing operation ring 2005, there is provided an engaging portion 2005b which slidably engages with the engaging portion 2004j of the outer tube portion 2004a, while the internal periphery of the focusing operation ring 2005 is provided with a key groove 2005a of a predetermined length, parallel to the optical axis L, to engage with a key projection 2011b to be explained later.

The zooming operation ring 2006 is to be manipulated in case the focal length is continuously varied in the image taking operation. On the internal periphery of the zooming operation ring 2006, there are provided an engaging portion 2006b for slidably engaging with the engaging portion 2004k of the outer tube portion 2004a and a projection 2006a which protrudes from the internal periphery, passes through the peripheral escape groove 2004i and engages with a recess 2007d of the zoom cam ring 2007.

The inner tube portion 2004b serves to rotatably support the zoom cam ring 2007, to be explained later, about the optical axis L, and to support the sliding tubes 2008, 2009, 2010 to be explained later, movably in the direction of the optical axis L. The inner tube portion 2004b is provided with penetrating straight grooves 2004c, 2004e, 2004f, parallel to the optical axis L, for guiding pins 2080, 2090, 2100 to be explained later. On the external periphery of the inner tube portion 2004b, there are provided engaging portions 2040a, 2040b for rotatably supporting the zoom cam ring 2007 and limiting the movement thereof in the direction of the optical axis L. On the internal periphery of the inner tube portion 2004b, there are provided escape grooves 2004h, 2004h' to be explained later. On the external periphery of the inner tube portion 2004b, there is fixed, with a screw 2021, a cover tube 2022 of which an end is supported by the flange 2004d. In the internal periphery of the inner tube portion 2004b, there is slidably fitted the sliding tube 2008 to be explained later.

The escape grooves 2004h, 2004h' are provided for passing the protruding portions 2013a, 2013a' of the voice coil motors 2016, 2016' when the sliding tube 2009, bearing the voice coil motors thereon, is inserted into the inner tube portion 2004b. These escape grooves 2004h, 2004h' also enable the zooming operation of the protruding portions 2013a, 2013a' along the optical axis L. As shown in FIG. 2, the escape grooves 2004h, 2004h' are formed by penetrating the internal periphery of the inner tube portion 2004b including the smaller diameter portion 2004g, parallel to the optical axis L, in positions respectively opposed to the protruding portions 2013a, 2013a' of the voice coil motors 2016, 2016'. The escape grooves 2004h, 2004h' are composed, as shown in FIG. 1, of a portion from the mounting face of the smaller diameter portion 2004g, where the lens barrel-side mount unit 2006 is mounted, to an initial position of the sliding tube 2009, and a portion in which the sliding tube 2009 moves in the zooming operation. In the third embodiment of the present invention, the escape grooves 2004h, 2004h' are formed, in the radial direction of the zoom cam ring 2007 supported by the external periphery of the inner tube portion 2004b and of the inner tube portion 2004b, in a partly overlapping manner (a range P' in the direction of the optical axis L) across the inner tube portion 2004b.

The zoom cam ring 2007 serves to provide the pins 2080, 2090, 2100, to be explained later, with a driving force along the straight grooves 2004c, 2004e, 2004f. The zoom cam ring 2007 is provided with cam grooves 2007a, 2007b, 2007c, which are formed penetrating through the zoom cam ring 2007 in a direction skewed relative to the optical axis L and in which the pins 2080, 2090, 2100 are movably fitted, a notch 2007d formed at the end of the smaller diameter portion 2004g of the zoom cam ring 2007, and engaging portions 2071a, 2071b for slidably engaging with the engaging portions 2040a, 2040b of the inner tube portion 2004b. The zoom cam ring 2007 is rotatably supported on the external periphery of the inner tube portion 2004b.

The sliding tube 2008 serves to move the lens support frame 2011, to be explained later, in the direction of the optical axis L. The sliding tube 2008 is provided with escape grooves 2008a, 2008b which are formed parallel to the optical axis L and in which fitted are the pins 2090, 2100 to be explained later. The lens support frame 2024 is mounted, with screws 2023, to the end of the smaller diameter portion 2002g of the sliding tube 2008. On the external periphery of the sliding tube 2008, there are provided a pin mounting portion 2008d for mounting the pin 2080 to be explained later and a male helicoid screw portion 2008c at the front end side of the sliding tube 2008.

The pin 2080 moves along the straight groove 2004c and the cam groove 2007a, thereby moving the sliding tube 2008 along the optical axis L. The pin 2080 protrudes from the external periphery of the sliding tube 2008 and movably fitted into the straight groove 2004c and the cam groove 2007a.

The lens support frame 2011 serves to support the first lens group G1'. On the internal periphery of the lens support frame 2011, there are provided a lens mounting portion 2011c protruding from the internal periphery and serving to mount the first lens group G1', and a female helicoid screw portion 2011a engaging with the male helicoid portion 2008c of the sliding tube 2008. On the external periphery of the lens support frame 2011, there is provided a key projection 2011b for engaging with the key groove 2005a of the focusing operation ring 2005.

The lens support frame 2024 serves to support the sixth lens group G6'. On the internal periphery of the lens support frame 2024, there is provided a lens mounting portion 2024a for mounting the sixth lens group G6'.

The sliding tube 2009 is a tubular member serving to support a part of the third lens group G3', the vibration reducing lens G4' to be explained later and the voice coil motors (VCM) 2016, 2016' and to support the sliding tube 2010 to be explained later movably in the direction of the optical axis L. The sliding tube 2009 is provided with an escape groove 2009a formed parallel to the optical axis L and accepting the pin 2100 to be explained later, a penetrating portion 2009d in which the vibration reducing lens frame 2012, to be explained later, penetrates so as to be movable in the vibration reducing operation, and rod-shaped projections 2009e, 2009f, 2009g to be explained later. Also a support frame 2091 to be explained later is detachably fixed to the sliding tube 2009. On the external periphery of the sliding tube 2009, there are provided a pin mounting portion 2009b for mounting the pin 2090 to be explained later, and housing portions 2009c, 2009c' formed at the side of the smaller diameter portion 2004g and serving to respectively house and support a part of the voice coil motors 2016, 2016'. On the internal periphery of the sliding tube 2009, the third lens group G3' is mounted in front (at the object side) of the voice coil motors 2016, 2016'. On the internal periphery of the sliding tube 2019 there is movably fitted a sliding tube 2010 to be explained later.

Rod-shaped projections 2009e, 2009f, 2009g fit into the holes 2091e, 2091f, 2091g formed on the support frame 2091 to connect the same with the sliding tube 2009. As shown in FIG. 7, the rod-shaped projections 2009e, 2009f, 2009g extend parallel to the optical axis L, from a face of the sliding tube 2009, at the side of the lens barrel-side mount member 2002. As shown in FIG. 8, the rod-shaped projection 2009e is positioned at a gap portion S2' to be explained later, while the rod-shaped projections 2009f, 2009g are positioned at a gap portion S1' to be explained later. The rod-shaped projections 2009e, 2009f, 2009g are positioned about the optical axis L, with a mutual angular distance of 120°. The rod-shaped projections 2009e, 2009f, 2009g respectively fit into the holes 2091e, 2091f, 2091g to position and fix the support frame 2091 and the sliding tube 2009 without any play therebetween.

The support frame 2091 serves to support a part of the voice coil motors 2016, 2016' and the fifth lens group G5'. The support frame 2091 is provided, on a face thereof at the object side, with the holes 2091e, 2091f, 2091g in which the rod-shaped projections 2009d, 2009f, 2009g are to be fitted, and a penetrating portion 2009d in which the vibration reducing lens frame 2012 penetrates. The support frame 2091 is fixed, by screws 2092e, 2092f, 2092g, to the sliding tube 2009 of which external periphery is provided with housing portions 2091c, 2091c' for respectively housing parts of the voice coil motors 2016, 2016'. The fifth lens group G5' is mounted on the internal periphery of the sliding tube 2009.

The voice coil motors 2016, 2016' serve to drive the vibration reducing lens frame 2012 by giving forces thereto, respectively in the x- and y-directions. The voice coil motors 2016, 2016' are mutually same in structure, except that the direction of force applied to the vibration reducing lens frame 2012 is different. As shown in FIGS. 7 and 8, the voice coil motor 2016 (2016') is composed of a yoke 2015a (2015a') mounted in the housing portion 2091' (2091c') of the support frame 2091, a yoke 2015b (2015b') mounted in the housing portion 2009c (2009c') of the sliding tube 2009, permanent magnets 2014a (2014a'), 2014b (2014b') respectively mounted on the yokes 2015a (2015a'), 2015b (2015b') for generating a magnetic field therebetween, and a coil 2013 (2013') consisting of plural turns of a conductive wire, positioned between the above-mentioned permanent magnets and mounted on the vibration reducing lens frame 2012. As shown in FIG. 7, the voice coil motors 2016, 2016' partly protrude from the external periphery of the sliding tube 2009 and the support frame 2091. As shown in FIG. 8, the voice coil motors 2016, 2016' are positioned with an angular space of 90° with respect to the optical axis L. The outermost portions of the voice coil motors 2016, 2016' are protruding portions 2013a, 2013a', which protrude in the escape grooves 2004h, 2004h' formed on the internal periphery of the inner tube portion 2014b.

The vibration reducing lens frame 2012 serves to support the vibration reducing lens G4'. On the external periphery of the vibration reducing lens frame 2012, there are provided coil mounting portions 2012y', 2012x in protruding manner, for respectively supporting the coils 2013, 2013' constituting a part of the voice coil motors 2016, 2016'. On the internal periphery of the vibration reducing lens frame 2012, there is provided a lens mounting portion 2012a for mounting the vibration reducing lens G4', as shown in FIG. 7. The vibration reducing lens frame 2012 is supported by the sliding tube 2009 across a support member (not shown), so as to be movable by a predetermined amount in a direction perpendicular or substantially perpendicular to the optical axis. Gap portions S1', S2' are formed between the external periphery of the vibration reducing lens frame 2012 and the internal periphery of the inner tube portion 2004b, so as to avoid the coil mounting portions 2012y, 2012x.

The sliding tube 2010 serves to support the second lens group G2'. On the external periphery of the sliding tube 2010, there is provided, as shown in FIG. 7, a pin mounting portion 2010a for mounting the pin 2100 to be explained later, and, on the internal periphery of the sliding tube 2010, there is provided a lens mounting portion 2010b for mounting the second lens group G2'.

The pins 2090, 2100 respectively move along the straight grooves 2004e, 2004f and the cam grooves 2007b, 2007c to move the sliding tubes 2009, 2010 in the direction of the optical axis L. The pin 2090 protrudes from the external periphery of the sliding tube 2009 and is movably fitted in the escape groove 2008a, the straight groove 2004e and the cam groove 2007b, while the pin 2100 protrudes from the external periphery of the sliding tube 2010 and is movably fitted in the escape groove 2009a, the straight groove 2004f and the cam groove 2007e.

In the following there will be explained the functions of the above-explained lens barrel, in each of the zooming operation, focusing operation, and vibration reducing operation.

(Zooming Operation)

When the photographer rotates the zooming operation ring 2006, the projection 2006a thereof pushes the notch 2007d of the zoom cam ring 2007 in a direction perpendicular to the plane of FIG. 7. The zoom cam ring 2007 integrally rotates with the zooming operation ring 2006 about the optical axis L, whereby the pin 2090 moves in contact with a lateral face of the cam groove 2007b and is pushed thereby. The pin 2090, receiving a driving force, at the contact position with the lateral face of the cam groove 2007b, in a direction perpendicular thereto, moves in the direction of the optical axis L along the straight groove 2004e. As a result, the sliding tube 2009 bearing the pin 2090 moves, together with the voice coil motors 2016, 2016', the third and fifth lens groups G3', G5', the vibration reducing lens frame 2012 and the vibration reducing lens G4', from a position shown in FIG. 7 (hereinafter called initial position) in the direction along the optical axis L. In this operation, the protruding portions 2013a, 2013a' of the coils 2013, 2013' move in the direction of the optical axis L, along the escape grooves 2004h, 2004h' formed on the internal periphery of the inner tube portion 2004b. Also the lens support frame 2024 supporting the sixth lens group G6' moves integrally with the sliding tube 2009, in the direction of the optical axis L.

Also as a result of the rotation of the zoom cam ring 2007, the pins 2080, 2100 are respectively pushed by the lateral faces of the cam grooves 2007a, 2007c. By the driving forces at the contact positions with the lateral faces of the cam grooves 2007a, 2007c, the pins 2080, 2100 respectively move along the straight grooves 2004c, 2004f. As a result, the sliding tubes 2008, 2009 respectively bearing the pins 2080, 2100 move in the direction of the optical axis L. The sliding tube 2008 and the lens support frame 2011 are mutually coupled by the engagement of the male helicoid portion 2008c and the female helicoid portion 2011a. Consequently, when the sliding tube 2008 is moved, the lens support frame 2011 is guided by the key groove 2005a engaging with the key projection 2011b and moves in the direction of the optical axis L.

A zooming operation is thus achieved by the movement, in the direction of the optical axis L, of the first lens group G1', the second lens group G2', the third lens group G3', the vibration reducing lens G4', the fifth lens group G5' and the sixth lens group G6'. The focal length can be adjusted by the direction and angle of rotation of the zooming operation ring 2006.

(Focusing Operation)

When the photographer rotates the focusing operation ring 2005, a longitudinal lateral face of the key groove 2005a pushes the key projection 2011b, whereby the lens support frame 2011 tends to rotate about the optical axis L. The lens support frame 2011 is coupled, by the engagement of the male helicoid screw portion 2008c and the female helicoid screw portion 2011a, with the sliding tube 2008, of which pin 2080 can only move along the straight groove 2004e. Consequently the sliding tube 2008 cannot rotate and the lens support frame 2011 rotates and moves in the direction of the optical axis L, under the engagement between the female helicoid screw portion 2011a and the male helicoid screw portion 2008c of the sliding tube 2008.

A focusing operation can thus be achieved by the movement of the first lens group G1' in the direction of the optical axis L. The focus state can be adjusted by the direction and amount of rotation of the focusing operation ring 2005.

(Vibration Reducing Operation)

A vibration sensor (not shown), provided in the lens barrel 2001 or the camera body on which the lens barrel 2001 is mounted, detects the vibration generated in the lens barrel 2001 and the camera body. A CPU (not shown) provided in the lens barrel 2001 or the camera body receives the output signal of the vibration sensor and calculates the driving amount of the vibration reducing lens G4' required for canceling the vibration. The CPU controls a drive circuit (not shown), thereby regulating a current, supplied from a power source, to a value corresponding to the drive amount. The regulated current is supplied to the coils 2013, 2013' of the voice coil motors 2016, 2016' to generate electromagnetic forces therein, by the magnetic fields between the yokes 2015a, 2015a' and 2015b, 2015b'. As a result, the vibration reducing lens frame 2012 is driven by a predetermined amount in the direction perpendicular to the optical axis, and the vibration is reduced by the fourth lens group G4'. The direction and amount of drive of the vibration reducing lens frame 2012 is determined by the direction and magnitude of the electromagnetic forces generated in the voice coil motors 2016, 2016'. The direction and amount of drive of the vibration reducing lens frame 2012 can be varied by controlling the currents supplied to the coils 2013, 2013' and the magnetic fields.

In the third embodiment of the present invention, the rod-shaped projections 2009f, 2009g are positioned in the gap portion S1', which is approximately opposed to the voice coil motors 1016, 1016' as shown in FIG. 8. Also the rod-shaped projection 2009e is positioned in the gap portion S2', located in a range of 90° between the voice coils motors 2016 and 2016'. Consequently, in case the vibration reducing apparatus has a structure in which the voice coil motors 2016, 2016' protrude from the external periphery of the vibration reducing lens frame 2012 and in case the third and fourth lens groups G3', G4' are positioned in front of and behind the voice coil motors 2016, 2016', it is possible to prevent the mutual interference between the voice coil motors 2016, 2016' and the rod-shaped projections 2009e, 2009f, 2009g. Thus, as the rod-shaped projections 2009e, 2009f, 2009g need not be positioned outside the voice coil motors 2016, 2016', it is rendered possible to reduce the external diameter of the lens barrel 2001, thus achieving compactization thereof. Also the inner tube portion 2004b of the lens barrel 2001 need not be provided therein with escape grooves for the rod-shaped projections 2009e, 2009f, 2009g, it is rendered possible to reduce the working cost of such inner tube portion and to avoid loss of the rigidity of the lens barrel 2001.

In the third embodiment of the present invention, the rod-shaped projections 2009e, 2009f, 2009g are positioned about the optical axis L and in the gap portions S1', S2' in a well-balanced manner, with a mutual angular spacing of 120°. Also in case a position detector for detecting the position of the vibration reducing lens G4' is mounted on the external periphery of the vibration reducing lens frame 2012, the rod-shaped projections 2009e, 2009f, 2009g can be so positioned as to avoid such position detector. Consequently it is possible to connect and position, in a well-balanced manner, the sliding tube 2009 supporting the third lens group G3' and the support frame 2091 supporting the fifth lens group G5'. As a result, the third lens group G3' and the fifth lens group G5' can be prevented from displacement, inclination or slanting relative to the optical axis L, and the relative positional relationship of these lens groups can be stabilized with a high precision.

In the third embodiment of the present invention, the zoom cam ring 2007 is provided on the external periphery of the inner tube portion 2004b and the sliding tube 2009 is provided inside the internal periphery of the inner tube portion 2004b. It is therefore possible to avoid an enlargement of the internal diameter of the zoom cam ring 2007, for the purpose of preventing the mutual interference between a part of the voice coil motors 2016, 2016' and the zoom cam ring 2007, thereby suppressing the radial length of the lens barrel 2001. Also in the third embodiment of the present invention, the internal periphery of the inner tube portion 2004b is provided with the escape grooves 2004h, 2004h' for passing the protruding portions 2013a, 2013a' of the coils 2013, 2013'. It is therefore possible to further reduce the radial dimension of the lens barrel 2001. Furthermore, according to the third embodiment of the present invention, the zoom cam ring 2007 and the escape grooves 2004h, 2004h' are provided in an overlapping manner (range P' in FIG. 7) across the inner tube portion 2004b in the radial direction thereof. For this reason, the lens barrel 2001 can be reduced also in the length along the optical axis L.

[Fourth Embodiment]

Figure 9:
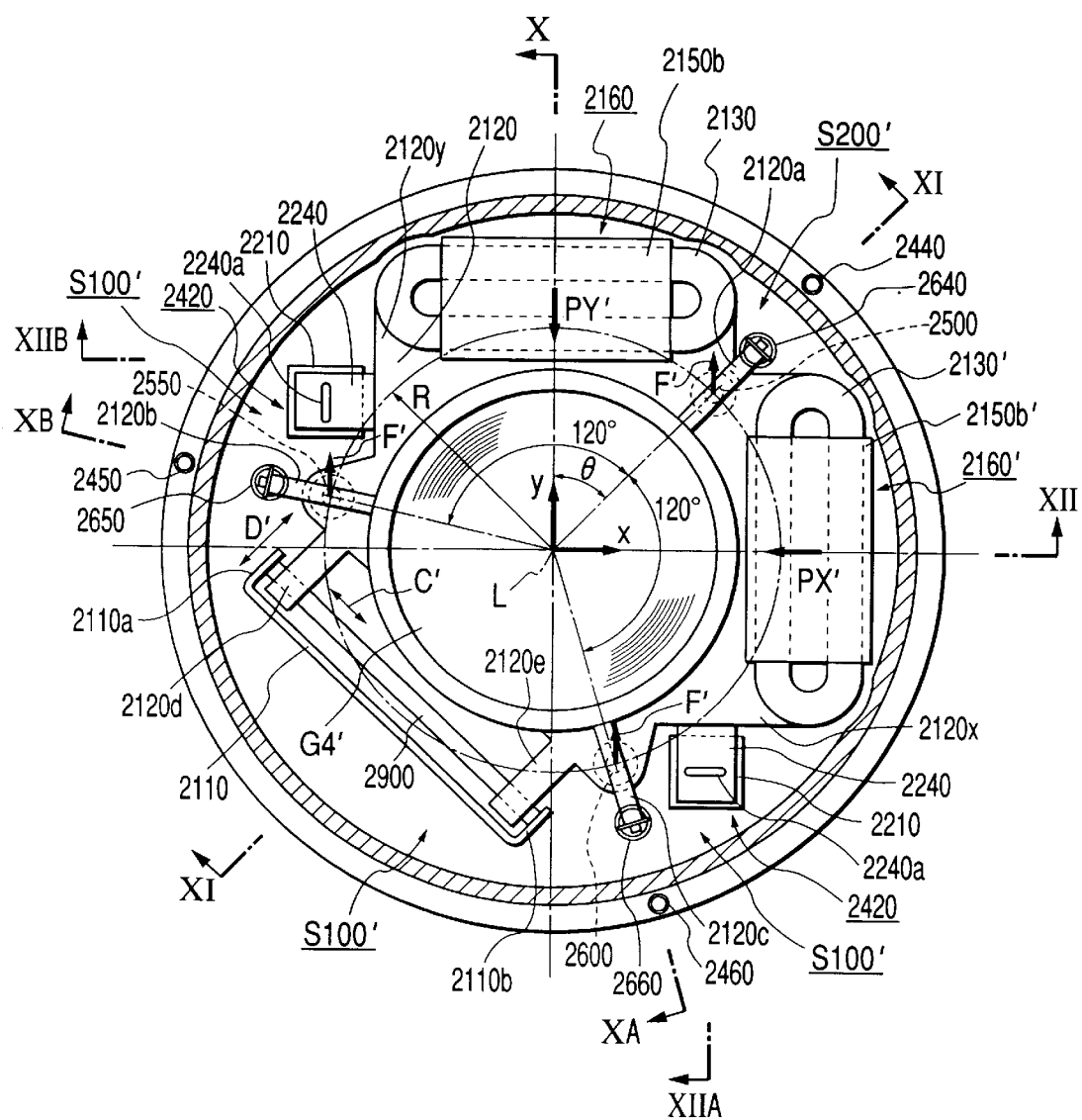
FIG. 9 is a sectional view of a vibration reducing apparatus constituting a fourth embodiment of the present invention.
Figure 10:
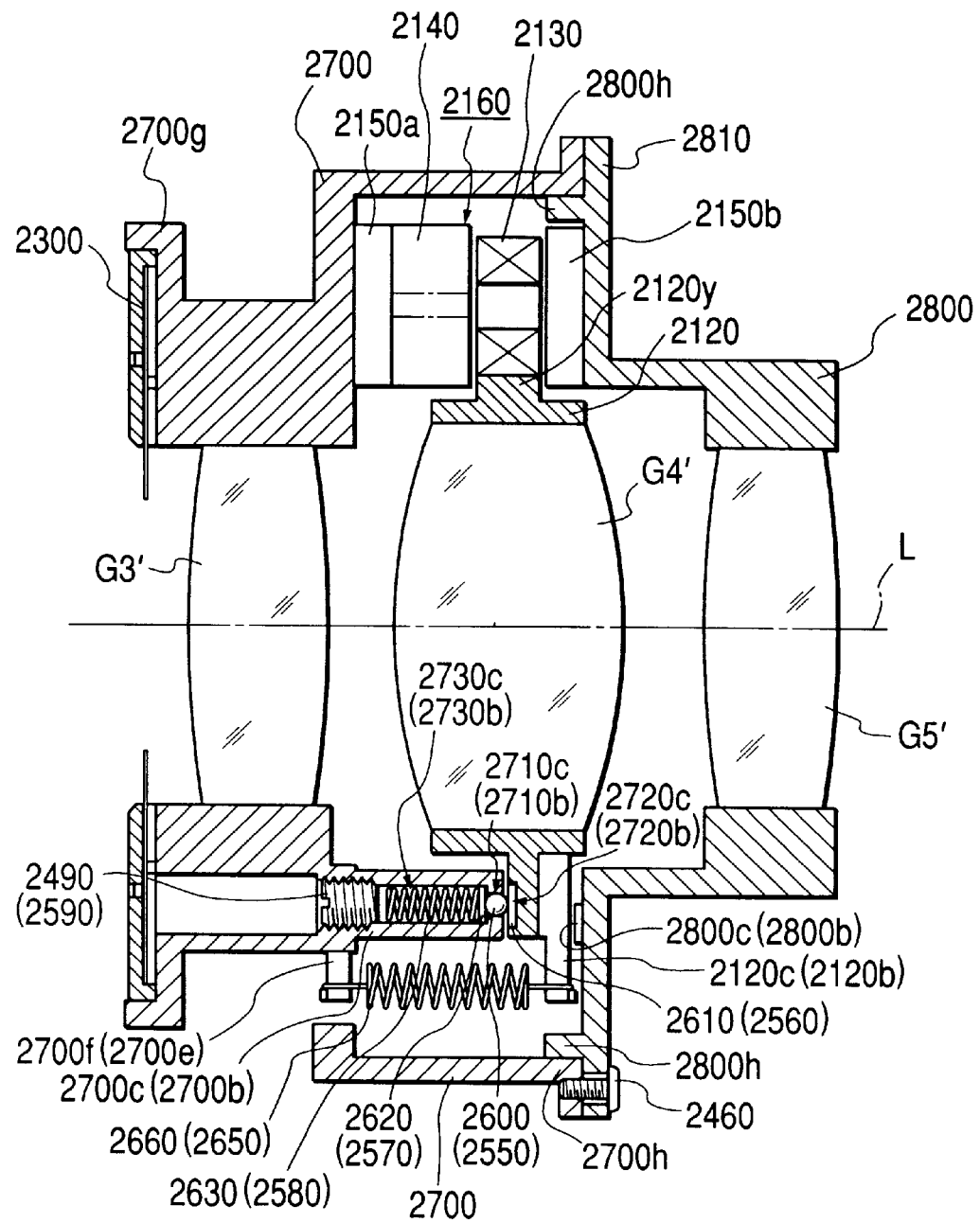
FIG. 10 is a sectional view taken along a line X–XA in FIG. 9.
Figure 11:
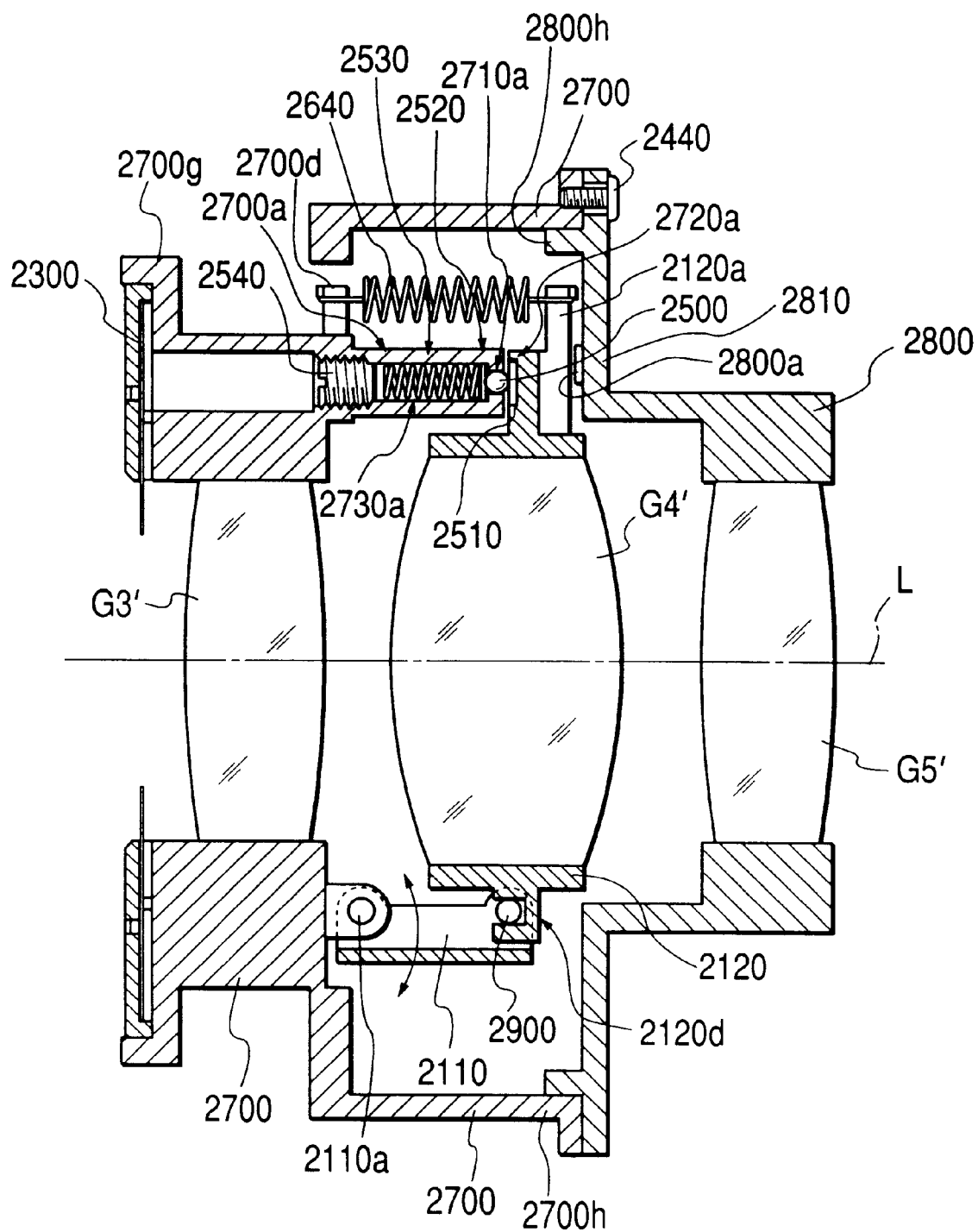
FIG. 11 is a sectional view taken along a line XI–XIV in FIG. 9.
Figure 12:
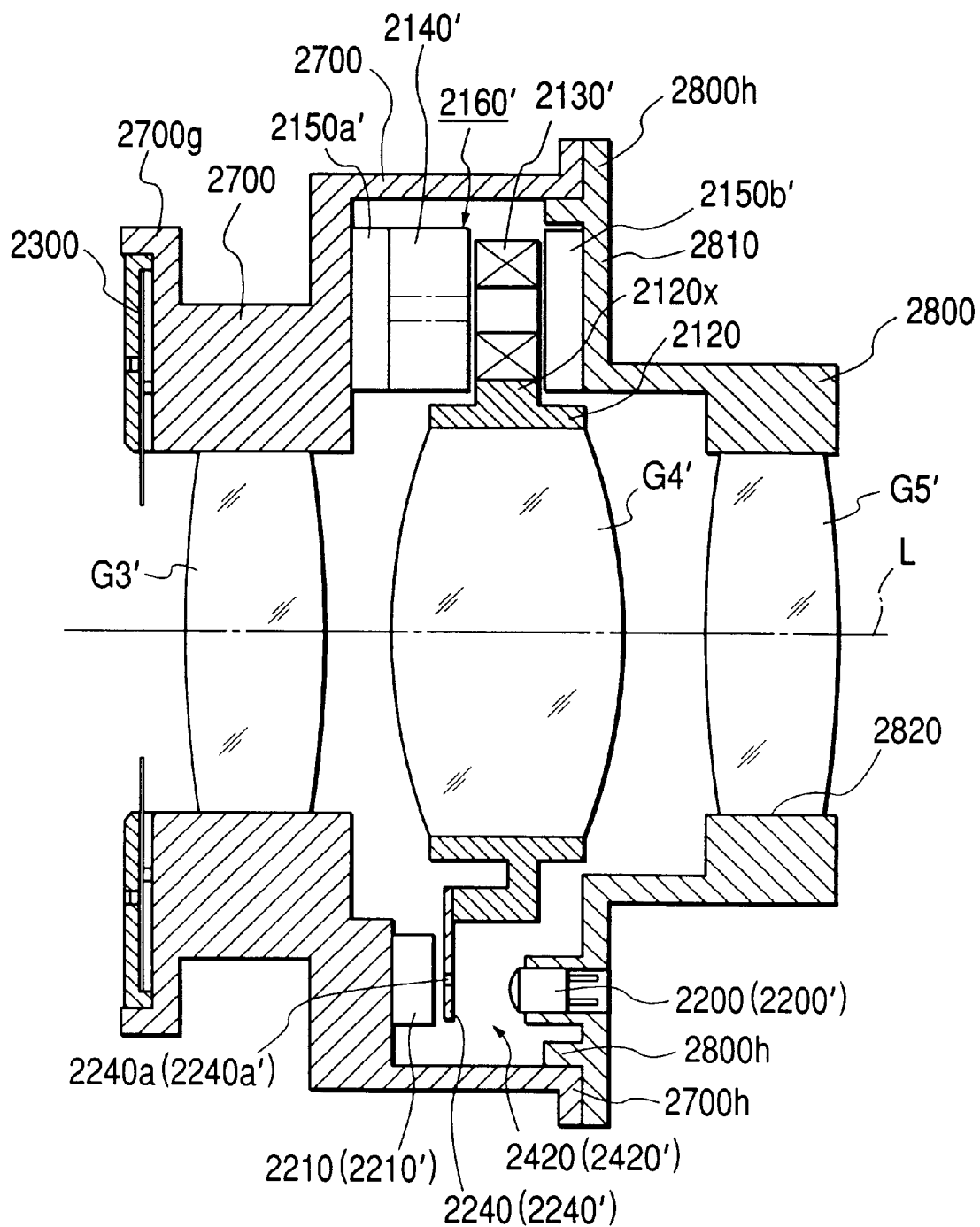
FIG. 12 is a sectional view alone a line XII–XIIA in FIG. 9.

FIG. 9 is a sectional view of a vibration reducing apparatus constituting a fourth embodiment of the present invention, while FIG. 10 is a sectional view taken along a line X–XA in FIG. 9, FIG. 11 is a sectional view taken along a line XI—XI in FIG. 9, and FIG. 12 is a sectional view taken along a line XII–XIIA in FIG. 9. The members shown in the cross section along a line X–XB in FIG. 9 are represented by parenthesized numbers in FIG. 10. Also the members shown in the cross section along a line XII–XIIB in FIG. 9 are represented by parenthesized numbers in FIG. 12.

A vibration reducing lens frame 2120 is provided, as shown in FIG. 12, with slit members 2240, 2240' positioned on a plane perpendicular to the optical axis L as will be explained later, and, as shown in FIGS. 10 and 11, steel ball receiving members 2510, 2560, 2610 at the side of steel ball receiving portions 2700a, 2700b, 2700c to be explained later. On the external periphery of the vibration reducing lens frame 2120, there are provided, as shown in FIG. 9, spring support portions 2120a, 2120b, 2120c positioned about the optical axis L with a mutual angular distance of 120° and hooks 2120d, 2120e, and, as shown in FIGS. 10 and 12, coil mounting portions 2120y, 2120x in protruding manner for respectively mounting coils 2130, 2130' of voice coil motors 2160, 2160' to be explained later.

Gap portions S100', S200' are formed between the external periphery of the vibration reducing lens frame 2120 and the internal periphery of the inner tube portion 2004b, so as to avoid the coil mounting portions 2120y, 2120x. As shown in FIG. 7, the gap portion S100' is formed in a position opposed or substantially opposed, across the optical axis L, to either or both of the voice coil motors 2160, 2160'. The gap portion S200' is formed with an angular range of 90° sandwiched between the voice coil motors 2160, 2160'. In the gap portion S100' there are provided the spring support portion 2120a, the steel ball 2500 of the steel ball receiving portion 2700a, the steel ball receiving member 2510, a spring 2640 to be explained later and a screw 2440. Also in the gap portion S200' there are provided the spring support portions 2120b, 2120c, the steel balls 2550, 2600 of the steel ball receiving portions 2700b, 2700c, the steel ball receiving members 2560, 2610, springs 2650, 2660 to be explained later and screws 2450, 2460. In this manner the gap portions S100', S200' can be utilized as escape spaces for members extending along the optical axis L.

The steel ball receiving members 2510, 2560, 2610 serve to guide the movement of the vibration reducing lens frame 2120 in a direction perpendicular or substantially perpendicular to the optical axis L. These members are positioned about the optical axis L with a mutual angular distance of 120° and are in contact, as shown in FIGS. 10 and 11, with steel balls 2500, 2550, 2600 for allowing smooth movement of the vibration reducing lens frame 2120. These members are formed of a metal harder than the steel balls 2500, 2550, 2600. The steel ball receiving members 2510, 2560, 2610 are preferably provided with a flat surface, in order to realize facial contact with end faces 2720a, 2720b, 2720c of the steel ball receiving portions 2700a, 2700b, 2700c to be explained later.

Springs 2640, 2650, 2660 serve to support the vibration reducing lens frame 2120 movably with respect to a base member 2700, and to bias the vibration reducing lens frame 2120 toward the steel balls 2500, 2550, 2600. The springs 2640, 2650, 2660 are mounted, at an end thereof, respectively on the spring support portions 2120a, 2120b, 2120c, and, at the other end, respectively on spring support portions 2700d, 2700e, 2700f to be explained later. In the fourth embodiment of the present invention, the total biasing force generated by the springs 2640, 2650, 2660 is preferably maintained from 1.5 times to 5 times of the total weight (hereinafter represented as W) of the vibration reducing lens G4', the vibration reducing lens frame 2120, the coils 2130, 2130', the steel ball receiving members 2510, 2560, 2610 and the slits 2240, 2240', namely within a range from 1.5W to 5W.

The base member 2700 is a casing member for housing the vibration reducing lens G4', the vibration reducing lens frame 2120 and a driving mechanism composed for example of the voice coil motors 2160, 2160', a guide shaft 2900, the springs 2640, 2650, 2660 etc. The base member 2700 is provided, as shown in FIGS. 10 and 11, with the steel ball receiving portions 2700a, 2700b, 2700c, the spring support portions 2700d, 2700e, 2700f and a shaft 2110c, and, as shown in FIGS. 10 and 12, yokes 2150a, 2150a' of the voice coil motors 2160, 2160' and photosensors (PSD) 2210, 2210' of position sensors 2420, 2420'. On the external periphery of the base member 2700, there is provided, as shown in FIGS. 10 to 12, an engaging portion 2700h for engaging with an engaging portion 2800h of a protective member 2800 to be explained later. On the internal periphery of the base member 2700, there are mounted, in the order from the object side, a diaphragm 2300 to be explained later and the third lens group G3' in such a manner that their centers coincide with the optical axis L.

A protective member 2800 is a casing member for protecting, in cooperation with the base member 2700, the driving mechanism composed of, for example, the vibration reducing lens G4', the vibration reducing lens frame 2120 and the voice coil motors 2160, 2160' provided in the internal periphery of the base member 2700. The protective member 2800 is provided, as shown in FIGS. 10 and 12, with yokes 2150b, 2150b' of the voice coil motors 2160, 2160', and light emitting elements (LED) 2200, 2200' of position sensors 2420, 2420', and, as shown in FIGS. 10 and 11, with lens frame receiving members 2800a, 2800b, 2800c. On the external periphery of the protective member 2800, there is formed a flange 2810. On the internal periphery of the protective member 2800, there is mounted, as shown in FIGS. 10 to 12, the fifth lens group G5' in such a manner that the center thereof coincides with the optical axis L.

Lens frame receiving portions 2800a, 2800b, 2800c serve to receive the vibration reducing lens frame 2120 in case of a movement thereof to the right in FIGS. 10 and 11, and to limit the movement thereof within a predetermined range. The lens frame receiving portions 2800a, 2800b, 2800c are formed on the protective member 2800, at the side of the vibration reducing lens frame 2120, about the optical ax is L with a mutual angular distance of 120°, and preferably formed with a flat surface, in order to realize facial contact with the vibration reducing lens frame 2120. The distance between the lens frame receiving portions 2800a, 2800b, 2800c and the vibration reducing lens frame 2120 is preferably so selected that the steel balls 2500, 2550, 2600 do not fall off from the steel ball housing portions 2710a, 2710b, 2710c when the steel ball receiving members 2510, 2560, 2610 are separated from the end faces 2720a, 2720b, 2720c.

Engaging portions 2700h, 2800h serve, when mutually fitted, to maintain the relative positional relationship of the base member 2700 and the protective member 2800. The engaging portion 2700h is formed on the external periphery of the base member 2700, while the engaging portion 2800h is formed on the external periphery of the protective member 2800. The engaging portions 2700h, 2800h are maintained in the mutually engaged state in a direction parallel to the optical axis L (thrust direction) by fixing screws 2440, 2450, 2460 provided about the optical axis L with a mutual angular distance of 120°.

A diaphragm unit 2300 serves to limit the light beam and the amount of light, and it is mounted on a diaphragm mounting portion 2700g formed on the base member 2700 in such a manner that the center of the diaphragm unit coincides with the optical axis L. The diaphragm unit 2300 is precisely positioned with respect to the third lens group G3' and the vibration reducing lens G4'.

A guide shaft 2900 serves to guide the vibration reducing lens frame 2120 in the movement thereof in a direction perpendicular or substantially perpendicular to the optical axis L. The guide shaft 2900 is provided in a direction C', forming a non-regular angle with the x- or y-direction in FIG. 9. The guide shaft 2900 engages, movably in the direction C', with the hooks 2120d, 2120e of the vibration reducing lens frame 2120.

A guide arm 2110 serves to move the vibration reducing lens frame 2120 in a direction parallel to the guiding direction C' of the guide shaft 2900. The guide arm 2110 is provided, on both ends thereof, with bent portions 2110a, 2110b which rotatably support the guide shaft 2900. As shown in FIG. 11, the guide arm 2110 is supported, at the side of the base member 2700, rotatably in a direction indicated by an arrow, with respect to a shaft 2110c. The rotation of the guide arm 2110 allows the vibration reducing lens frame 2120 to move in a direction D' perpendicular to the guiding direction C' of the guide shaft 2900.

The voice coil motors 2160, 2160' serve to drive the vibration reducing lens frame 2120 by providing the same respectively with forces in the y- and x-directions. These motors are same in structure, except in the difference in the direction of force given to the vibration reducing lens frame 2120. As shown in FIG. 10, the voice coil motor 2160 is composed of a yoke 2150b mounted on the protective member 2800 at the side of the vibration reducing lens frame 2120, a permanent magnet 2140 for generating a magnetic field in the space to the yoke 2150b, a coil 2130 positioned between the yoke 2150b and the permanent magnet 2140 and mounted on the vibration reducing lens frame 2120, and a yoke 2150a supporting the permanent magnet 2140 and mounted on the base member 2700 at the side of the vibration reducing lens frame 2120. In response to a current supply to the coil 2130, the vibration reducing lens G4' is driven by a downward force PY along the y-direction, and, in response to an inverse current supply to the coil 2130, the vibration reducing lens G4' is driven in the opposite (upward) direction.

Position sensors 2420, 2420' serve to respectively detect the positions in the y- and x-directions of the vibration reducing lens G4'. As these sensors are mutually same in the structure, the following explanation will be given on the sensor 2420 with reference to FIG. 12. The position sensor 2420 is composed of a light emitting element 2200 mounted on the protective member 2800 at the side of the vibration reducing lens frame 2120, a photosensor 2210 mounted on the base member 2700 at the side of the vibration reducing lens frame 2120, a slit member 2240 positioned between the light emitting element 2200 and the photosensor 2210, and a slit 2240a formed on the slit member 2240. The light emitted from the light emitting element 2200 is transmitted by the slit 2240a and reaches the photosensor 2210. With a movement of the slit 2240a, the position of the light transmitted by the slit 2240a and reaching the photosensor 2210 is changed. Such change in the light position varies the output signal of the photosensor 2210, so that the y-position of the vibration reducing lens G4' can be detected from such change in the output signal. The position sensors 2420, 2420' are respectively provided in the gap portions S100', S200' in such a manner as to avoid the spring support portions 2120b, 2120c, the springs 2650, 2660 and the steel ball receiving portions 2700b, 2700c and to oppose to the voice coil motors 2160, 2160'.

The steel ball receiving portions 2700a, 2700b, 2700c serve to support the steel balls 2500, 2550, 2600, are provided about the optical axis L with a mutual angular distance of 120° and have a same structure, as shown in FIGS. 10 and 11. The steel ball receiving portion 2700a is mounted, as shown in FIG. 11, on the base member 2700 at the side of the vibration reducing lens frame 2120, in a protruding manner thereto. The steel ball receiving portion 2700a is provided with a steel ball housing portion 2710a, an end face 2720a, and a compression spring housing portion 2730a.

The steel balls 2500, 2550, 2600 serve to cause smooth movement of and to guide the vibration reducing lens frame 2120, and are positioned, as shown in FIG. 7, in a plane perpendicular to the optical axis L, at a distance R from the optical axis L. The steel ball 2500 is provided in an angular position θ from the y-direction about the optical axis L, and the steel balls 2550, 2600 are respective provided at angular positions of 120° from the steel ball 2500. When the vibration reducing lens frame 2120 is driven by the voice coil motor 2160 in a state shown in FIG. 7, the driving force PY' thereof is directed downwards along the y-direction as shown in FIG. 9. As a result, there is generated a frictional force F' at the contact points between the steel balls 2500, 2550, 2600 and the steel ball receiving members 2510, 2560, 2610. The following relations stand, about the crossing point of the x- and y-axes, between the anticlockwise moment caused by the frictional force F' at the contact points of the steel balls 2500, 2600 and the clockwise moment caused by the frictional force F' at the contact point of the steel ball 2550:

$$F'\cdot R \sin \theta + F'\cdot R \sin (180-120-\theta) = F'\cdot R \sin (120-\theta) \sin \theta + \sin (60-\theta) = R \sin (120-\theta)$$

The foregoing relations stand at any angle from θ=0° to 180° and the anticlockwise moment is balanced with the clockwise moment. Consequently, the vibration reducing lens G4', when driven by the voice coil motor 2160, does not rotate about the crossing point of the x-axis and the y-axis. Therefore, any load, resulting from the twisting action by the moments, is not generated between the hooks 2120d, 2120e of the vibration reducing lens frame 2120 and the guide shaft 2900.

The compression spring receiving portion 2730a serves to house a steel ball receiving member 2520, and a compression spring 2530 to be explained later. In this portion 2730a, the steel ball receiving member 2520 and the compression spring 2530 are fixed with a screw 2540.

The compression spring 2530 serves to bias the steel ball receiving member 2520 toward the vibration reducing lens frame 2120. In the fourth embodiment of the present invention, the total biasing force generated by the springs 2530, 2580, 2630 is preferably selected at least equal to twice of the total biasing force generated by the springs 2640, 2650, 2660. For example, if the total biasing force generated by the springs 2640, 2650, 2660 is 1.5 W, the total biasing force generated by the springs 2530, 2580, 2630 is preferably selected at least equal to 3W. As a result, the vibration reducing lens G4' is supported in a position shown in FIGS. 7 to 10, under any situation.

The steel ball receiving member 2520 serves to receive the steel ball 2500 in contact therewith. It is formed with a harder metal than the steel ball 2500, preferably with a flat shape in order to realize a point contact with the steel ball 1500.

The steel ball housing portion 2710a serves to house the steel ball 2500 in a state slightly protruding from the end face 2720a, and is formed in a range from the bottom of the compression spring housing portion 2730a to the end face 2720a. As the steel ball housing portion 2710a has an internal diameter smaller than that of the compression spring housing portion 2730a, the steel ball receiving member 2520 does not jump out from the compression spring housing portion 2730a under the pressure of the compression spring 2530.

The end face 2720a serves as a guide member for receiving the vibration reducing lens frame 2120 in the leftward movement thereof, and is preferably formed with a flat surface, in order to realize a facial contact with the steel ball receiving member 2510.

In the following there will be explained the functions of the vibration reducing apparatus of the fourth embodiment of the present invention.

In a state shown in FIG. 9, the vibration reducing lens frame 2120 cannot rotate about the optical axis L because of the engagement of the hooks 2120d, 2120e thereof with the guide shaft 1900. The vibration reducing lens frame 2120 receives a downward force PY', along the y-direction, from the voice coil motor 2160, thereby moving on the guide shaft 2900 toward the lower right-hand side. The guide arm 2110, receiving the force PY', rotates clockwise about the shaft 2110c as shown in FIG. 11. The rotation of the guide arm 2110 causes a parallel displacement of the guide shaft 2900 in a direction (direction D' in the drawing) perpendicular to the longitudinal direction thereof. The vibration reducing lens frame 2120, being inhibited by the steel balls 2500, 2550, 2600 from the movement in the axial direction, moves in the y- and x-directions together with the vibration reducing lens G4', which thus moves in a direction forming an angle with the optical axis L, thereby reducing the vibration. On the other hand, if the vibration reducing lens frame 2120 receives a leftward force from the voice coil motor 2160' along the x-direction in the state shown in FIG. 9, the frame 2120 moves on the guide shaft 2900 in a direction toward upper left, and the guide shaft 2900 conducts a parallel displacement in the direction D' perpendicular to the longitudinal direction thereof. Consequently the vibration reducing lens frame 2120 can move to an arbitrary position in the plane perpendicular to the optical axis L.

Hooks 2120d, 2120e engage with the guide shaft 2900 in such a manner that they can slightly move in the direction of the optical axis L as shown in FIG. 11. In the state shown in FIGS. 10 and 11, if a leftward impact force is applied to the vibration reducing lens frame 2120, it starts to move toward the left. As a result, the steel ball receiving members 2510, 2560, 2610, 2520, 2570, 2620 receive the impact force in concentrated manner at the contact points with the steel balls 2500, 2550, 2600. The steel ball receiving members 2510, 2560, 2610 push the steel balls 2500, 2550, 2600 and the steel ball receiving members 2510, 2560, 2610 to the left, thereby compressing the springs 2530, 2580, 2630, which absorb the impact force, whereby the impact force at the contact points between the steel ball receiving members 2510, 2560, 2610, 2520, 2570, 2620 and the steel balls 2500, 2550, 2600 is relaxed and no dents (impact recesses) are formed at these contact points.

However, if the impact force applied to the vibration reducing lens frame 2120 exceeds a predetermined value, the end faces 2720a, 2720b, 2720c impinge on the steel ball receiving members 2510, 2560, 2610 thereby stopping the vibration reducing lens frame 2120. Since the steel ball receiving members 2510, 2560, 2610 are in facial contact with the end faces 2720a, 2720b, 2720c, no dents (impact recesses) are formed at the contact points. The steel ball receiving members 2510, 2560, 2610 and the steel ball receiving members 2520, 2570, 2620 sandwich the steel balls 2500, 2550, 2600 by the biasing force of the springs 2640, 2650, 2660. Consequently the steel balls 2500, 2550, 2600 do not fall off from the steel ball housing portions 2710a, 2710b, 2710c even when the vibration reducing lens frame 2120 moves to the left.

In a state shown in FIGS. 10 and 11, if a rightward impact force is applied to the vibration reducing lens frame 2120, it starts to move toward the right against the biasing force of the springs 2640, 2650, 2660. In this stat, the steel ball receiving members 2510, 2560, 2610 and those 2520, 2570, 2620 move in mutually separating directions. If the impact force is small, it is absorbed by the springs 2640, 2650, 2660, but, if the impact force is large, the lens frame receiving portions 2800a, 2800b, 2800c stop the vibration reducing lens frame 2120. Since the vibration reducing lens frame 2120 is in contact with the lens frame receiving portions 2800a, 2800b, 2800c, the steel balls 2500, 2550, 2600 do not fall off from the steel ball housing portions 2710a, 2710b, 2710c.

In the fourth embodiment of the present invention, the vibration reducing apparatus is formed as a unit by the base member 2700, constituting the casing member, and the protective member 2800. It is therefore possible to efficiently install the vibration reducing unit into the limited space inside the inner tube member 2004b. Also in the fourth embodiment of the present invention, as shown in FIG. 7, the gap portions S100', S200' are formed between the external periphery of the vibration reducing lens frame 2120 and the internal periphery of the inner tube portion 2004b, and, in such gap portions S100', S200', there can be provided the spring support portions 2120a, 2120b, 2120c, the steel ball receiving portions 2700a, 2700b, 2700c, the steel ball receiving members 2510, 2560, 2610, the springs 2640, 2650, 2660 and the screws 2440, 2450, 2560. As a result, the gap portions S100', S200' can be utilized as escape spaces for the components extending along the optical axis L.

In the foregoing third and fourth embodiments, two rod-shaped projections 2009f, 2009g are positioned in the gap portion S100' as shown in FIGS. 7 and 8, but it is also possible, as indicated by a chain line in FIG. 8, to form a wall-shaped projection 2009h within a predetermined rang, along a circumference about the optical axis L. In such case the frame member 2091 can be stably positioned and connected by the rod-shaped projection 2009e and the wall-shaped projection 2009h, particularly in the radial direction of the sliding tube 2009. Also in the foregoing lens barrel 2001, the third lens group G3' and the fifth lens group G5' are positioned respectively in front of and behind the vibration reducing lens G4', but either of the third and fifth lens groups may be dispensed with. In such configuration, the present invention may be applied to a supporting frame which supports the lens group, a fixing member on which the supporting frame is fixed and a connecting unit which connects these components. Also the diaphragm unit 2300 may be dispensed with or may be replaced by a diaphragm-shutter unit.

The present invention is not limited to the foregoing embodiments but is subject to various modifications or alterations within the technical concept of the present invention, and such modifications and alterations also fall into the range of equivalence of the present invention.

For example, in the first embodiment of the present invention, the zoom cam ring 1007 and the escape grooves 1004h, 1004h' mutually overlap in the range P of the inner tube portion 1004b, but they may be mutually displaced in the direction of the optical axis L so as not to form such overlapping portion. Also in the first embodiment of the present invention, the vibration reducing lens G4 is used only for the zooming operation, but the present invention is applicable not only to a component relating to the zooming operation only but also to a component relating to the focusing operation, or the focusing and zooming operation, or any other operation. Furthermore, in the first embodiment of the present invention, the escape grooves 1004h, 1004h' consist of a portion for inserting the sliding tube 1009 from the mounting face of the smaller diameter portion 1004g to the initial position and another portion for movement in the zooming operation, but such inserting portion and movement portion may partly overlap mutually.

In the second embodiment of the present invention, for example the flat portions 1101, 1201 are formed parallel to the guide shaft 1900 and the guide arm 1110. Also the flat portions 1102, 1103, 1202, 1203 are formed parallel to the voice coil motors 1160, 1160'. However, the positions of the flat portions 1101, 1102, 1103, 1201, 1202, 1203 are not limited to those explained above. Also any of the flat portions 1101, 1102, 1103, 1201, 1202, 1203 may be dispensed with. Furthermore, the flat portions 1101, 1102, 1103, 1201, 1202, 1203 may be formed by curved cut-off portions, and flat areas may be formed in a part of such curved cut-off portions.

In the second embodiment of the present invention, the flat portions 1101, 1102, 1103 and the flat portions 1201, 1202, 1203 are respectively formed on same planes in order to efficiently secure the mounting spaces for the components, but these flat portions may also be formed, for example, in a staggered manner. It is also possible to form the flat portions 1101, 1102, 1103 or the flat portions 1201, 1202, 1203 on either of the base member 1700 and the protective member 1800.

In the first and second embodiments of the present invention, the voice coil motor 1016 (1160) and the voice coil motor 1016' (1160') are so positioned that their driving directions mutually cross perpendicularly, but the crossing angle can be approximately 90° or another angle, according to the convenience of designing. Also the guide shaft 1900 is positioned at an angle of about 45° to the above-mentioned driving directions, but such angle is not restrictive. Furthermore, the number of the voice coil motors is not limited to one in each of the y- and x-directions. There may be provided two or more voice coil motors in each of the coil mounting portions 1012x (1120x), 1012y (1120y) of the vibration reducing lens frame 1012 (1120).

Furthermore, in the third embodiment of the present invention, the zoom cam ring 2007 and the escape grooves 2004h, 2004h' mutually overlap in the range P' of the inner tube portion 2004b, but they may be mutually displaced in the direction of the optical axis L so as not to form such overlapping portion. Furthermore, in the third embodiment of the present invention, the escape grooves 2004h, 2004h' consist of a portion for inserting the sliding tube 2009 from the mounting face of the smaller diameter portion 2004g to the initial position and another portion for movement in the zooming operation, but such inserting portion and movement portion may partly overlap mutually.

Also in the third embodiment of the present invention, the vibration reducing lens G4' is used only for the zooming operation, but the present invention is applicable not only to a component relating to the zooming operation only but also to a component relating to the focusing operation, or the focusing and zooming operation, or any other operation. Also in the third embodiment of the present invention, there has been explained a lens barrel in which the relative positional relationship of the third lens group G3', the fifth lens group G5' and the vibration reducing lens G4' is not changed, but the present invention is not limited to such configuration and is likewise applicable to a lens barrel in which the relative positional relationship of these lens groups varies by the zooming or focusing operation.

In the third and fourth embodiments of the present invention, the voice coil motor 2016 (2160) and the voice coil motor 2016' (2160') are so positioned that their driving directions mutually cross perpendicularly, but the crossing angle can be approximately 90° or another angle, according to the convenience of designing. Also the guide shaft 2900 is positioned at an angle of about 45° to the above-mentioned driving directions, but such angle is not restrictive. Furthermore, the number of the voice coil motors is not limited to one in each of the y- and x-directions. There may be provided two or more voice coil motors in each of the coil mounting portions 2012x (2120x), 2012y (2120y) of the vibration reducing lens frame 2012 (2120).

Also in the third and fourth embodiments of the present invention, the driving mechanism for driving the vibration reducing lens frame 2012, 2120 is composed for example of the voice coil motors 2016, 2016', 2160, 2160', but such configuration is not restrictive. The driving mechanism can be, for example, composed of compact rod-shaped ultrasonic motors or DC motors.

Therefore, it is intended that the invention not be limited to the preferred embodiments described herein, but that the invention will include all embodiments falling within the scope of the appended claims.

What is claimed is:

1. A vibration reducing apparatus housed in the internal periphery of a tubular member, comprising:

a vibration reducing optical system which reduces a vibration;

a supporting frame which supports said vibration reducing optical system, said supporting frame being provided, at least in a part of the external periphery thereof, with a gap portion which forms a gap to the internal periphery of said tubular member; and a drive unit which drives said supporting frame in a direction perpendicular or substantially perpendicular to an optical axis.

2. A vibration reducing apparatus according to claim 1, wherein said drive unit includes:

a first driving force generation device which drives said vibration reducing optical system in a first direction; and a second driving force generation device which drives said vibration reducing optical system in a second direction which is skewed relative to said first direction;

said first and second driving force generation devices are positioned with a predetermined mutual angular distance therebetween about an optical axis and;

said supporting frame is provided with a mounting portion protruding from the external periphery thereof and serving to mount at least a part of said first and second driving force generation devices.

3. A vibration reducing apparatus according to claim 2, wherein said first and second driving force generation devices are voice coil motors.

4. A vibration reducing apparatus according to claim 1, wherein said gap portion is a cut-off portion formed on the external periphery of said frame member or said base frame member.

5. A vibration reducing apparatus, comprising:

a base frame member housed in the internal periphery of a tubular member, said frame member being provided, at least in a part of the external periphery thereof, with a gap portion forming a gap to the internal periphery of said tubular member;

a vibration reducing optical system which reduces a vibration, and is provided in the internal periphery of said base frame member;

a supporting frame member which supports said vibration reducing optical system, and is provided in the internal periphery of said base frame member; and a drive unit which drives said supporting frame member in a direction perpendicular or substantially perpendicular to an optical axis.

6. A vibration reducing apparatus according to claim 5, wherein:

said base frame member is divided into a first frame member and a second frame member, and at least one of said first and second frame members is provided, on at least a part of the external periphery thereof, with a gap portion.

7. A vibration reducing apparatus according to claim 5, wherein:

said base frame member is divided into a first frame member and a second frame member; and said first and second frame members are provided, on at least a part of the external periphery thereof, with a continuous gap portion.

8. A vibration reducing apparatus according to claim 5, wherein:

said drive unit includes:
a first driving force generation device which drives said vibration reducing optical system in a first direction;
a second driving force generation device which drives said vibration reducing optical system in a second direction which is skewed relative to said first direction; and
a guide member which guides said vibration reducing optical system driven by at least one of said first and second driving force generation devices; and
said gap portion is formed close to at least one of said first driving force generation device; said second driving force generation device and said guide member.

9. A vibration reducing apparatus according to claim 8, wherein said first and second driving force generation devices are voice coil motors.

10. A vibration reducing apparatus according to claim 5, wherein said gap portion is provided, in at least a part thereof, with a flat portion.

11. A vibration reducing apparatus according to claim 5, wherein said gap portion is used as a mounting portion which mounts component to be mounted.

12. A vibration reducing apparatus according to claim 5, wherein said gap portion is a cut-off portion formed on the external periphery of said frame member or said base frame member.

13. A lens barrel having a tubular member of which internal periphery houses a vibration reducing optical system which reduces a vibration, a supporting frame which supports said vibration reducing optical system and is provided in at least a part of the external periphery of said supporting frame with a gap portion which forms a gap to the internal periphery of said tubular member, and a drive unit which drives said supporting frame in a direction perpendicular or substantially perpendicular to an optical axis, said lens barrel comprising:

a component extended in the direction of the optical axis;
wherein said gap portion serves as an escape portion for said component.

14. A lens barrel according to claim 13, wherein:

said drive unit includes a first driving force generation device which drives said vibration reducing optical system in a first direction and a second driving force generation device which drives said vibration reducing optical system in a second direction which is skewed relative to said first direction; and
said component is provided in a position opposed or substantially opposed, across the optical axis, to at least one of said first and second driving force generation devices.

15. A lens barrel according to claim 13, wherein said component is a driving member which generates or transmits the driving force for driving at least a part of the optical system or a diaphragm.

16. A lens barrel according to claim 15, wherein said driving member is a DC motor.

17. A lens barrel according to claim 15, wherein said driving member is an ultrasonic motor.

18. A lens barrel having a tubular member of which internal periphery houses a base frame member housed in said internal periphery and provided in at least a part of the external periphery of said supporting frame with a gap portion which forms a gap to the internal periphery of said tubular member, a vibration reducing optical system provided in the internal periphery of said base frame member which reduces a vibration, a supporting frame provided in the internal periphery of said base frame member which supports said vibration reducing optical system and a drive unit provided in the internal periphery of said base frame member which drives said supporting frame in a direction perpendicular or substantially perpendicular to an optical axis, said lens barrel comprising:

a component extended in the direction of the optical axis;
wherein said gap portion serves as an escape portion for said component.

19. A lens barrel according to claim 18, wherein:

said drive unit includes a first driving force generation device which drives said vibration reducing optical system in a first direction and a second driving force generation device which drives said vibration reducing optical system in a second direction which is skewed relative to said first direction; and
said component is provided in a position opposed or substantially opposed, across the optical axis, to at least one of said first and second driving force generation devices.

20. A lens barrel according to claim 18, wherein said component is a driving member which generates or transmits the driving force for driving at least a part of the optical system or a diaphragm.

21. A lens barrel according to claim 20, wherein said driving member is a DC motor.

22. A lens barrel according to claim 20, wherein said driving member is an ultrasonic motor.

23. A vibration reducing apparatus housed in the internal periphery of a tubular member, comprising:

a vibration reducing optical system which reduces a vibration;
a supporting frame which supports said vibration reducing optical system;
a drive unit which drives said supporting frame in a direction perpendicular or substantially perpendicular to an optical axis;
an optical member provided in front of or behind said vibration reducing optical system;
a fixing unit which fixes said optical member; and
a connecting unit which connects said optical member and said fixing unit;
wherein said supporting frame being provided, at least in a part of the external periphery thereof, with a gap portion forming a gap to the internal periphery of said tubular member; and
said connecting unit is provided in said gap portion.

24. A vibration reducing apparatus according to claim 23, wherein said optical member is a lens group, a diaphragm unit, a diaphragm-shutter unit or a combination thereof.

25. A vibration reducing apparatus according to claim 23, wherein, in said gap portion, there is provided a position detecting unit which detects the position of said vibration reducing optical system.

26. A vibration reducing apparatus according to claim 23, wherein said drive unit includes:

a first driving force generation device which drives said vibration reducing optical system in a first direction; and a second driving force generation device which drives said vibration reducing optical system in a second direction which is skewed relative to said first direction;

said first and second driving force generation devices are positioned with a mutual angular distance of 90° or substantially 90° therebetween about the optical axis; and said supporting frame is provided with a mounting portion protruding from the external periphery thereof and serving to mount at least a part of said first and second driving force generation devices.

27. A vibration reducing apparatus according to claim 26, wherein said first and second driving force generation devices are voice coil motors.

28. A vibration reducing apparatus according to claim 26, wherein said connecting units are axially-directed members provided in three positions with a mutual angular distance of 120° about the optical axis.

29. A vibration reducing apparatus according to claim 28, wherein at least one of said axially-directed members is provided in a range of 90° or substantially 90° sandwiched between said first and second driving force generation devices.

30. A vibration reducing apparatus housed in the internal periphery of a tubular member, comprising:

a vibration reducing optical system which reduces a vibration;

a supporting frame which supports said vibration reducing optical system;

a drive unit which drives said supporting frame in a direction perpendicular or substantially perpendicular to an optical axis;

a first optical member provided in front of said vibration reducing optical system;

a second optical member provided behind said vibration reducing optical system; and a connecting unit which connects said first and second optical members;

wherein said supporting frame being provided, at least in a part of the external periphery thereof, with a gap portion forming a gap to the internal periphery of said tubular member; and said connecting unit is provided in said gap portion.

31. A vibration reducing apparatus according to claim 30, wherein said optical member is a lens group, a diaphragm unit, a diaphragm-shutter unit or a combination thereof.

32. A vibration reducing apparatus according to claim 30, wherein, in said gap portion, there is provided a position detecting unit which detects the position of said vibration reducing optical system.

33. A vibration reducing apparatus according to claim 30, wherein said drive unit includes:

a first driving force generation device which drives said vibration reducing optical system in a first direction; and a second driving force generation device which drives said vibration reducing optical system in a second direction which is skewed relative to said first direction;

said first and second driving force generation devices are positioned with a mutual angular distance of 90° or substantially 90° therebetween about the optical axis; and said supporting frame is provided with a mounting portion protruding from the external periphery thereof and serving to mount at least a part of said first and second driving force generation devices.

34. A vibration reducing apparatus according to claim 33, wherein said first and second driving force generation devices are voice coil motors.

35. A vibration reducing apparatus according to claim 33, wherein said connecting units are axially-directed members provided in three positions with a mutual angular distance of 120° about the optical axis.

36. A vibration reducing apparatus according to claim 35, wherein at least one of said axially-directed members is provided in a range of 90° or substantially 90° sandwiched between said first and second driving force generation devices.

37. A vibration reducing apparatus housed in the internal periphery of a tubular member, comprising:

a vibration reducing optical system which reduces a vibration;

a supporting frame which supports said vibration reducing optical system;

a drive unit which drives said supporting frame in a direction perpendicular or substantially perpendicular to an optical axis; and a base member housing, in the internal periphery thereof, said vibration reducing optical system, said supporting frame and said drive unit and dividable into a first frame member and a second frame member;

wherein said supporting frame being provided, at least in a part of the external periphery thereof, with a gap portion forming a gap to the internal periphery of said tubular member; and there is provided, in said gap portion, a frame member connecting unit which connects said first and second frame members.

38. A vibration reducing apparatus according to claim 37, wherein at least one of said first and second frame members is provided with an optical member.

39. A vibration reducing apparatus according to claim 37, wherein said optical member is a lens group, a diaphragm unit, a diaphragm-shutter unit or a combination thereof.

40. A vibration reducing apparatus according to claim 37, wherein, in said gap portion, there is provided a position detecting unit which detects the position of said vibration reducing optical system.

41. A vibration reducing apparatus according to claim 37, wherein said drive unit includes:

a first driving force generation device which drives said vibration reducing optical system in a first direction; and a second driving force generation device which drives said vibration reducing optical system in a second direction which is skewed relative to said first direction;

said first and second driving force generation devices are positioned with a mutual angular distance of 90° or substantially 90° therebetween about the optical axis; and said supporting frame is provided with a mounting portion protruding from the external periphery thereof and serving to mount at least a part of said first and second driving force generation devices.

42. A vibration reducing apparatus according to claim 41, wherein said first and second driving force generation devices are voice coil motors.

43. A vibration reducing apparatus according to claim 41, wherein said connecting units are axially-directed members provided in three positions with a mutual angular distance of 120° about the optical axis.

44. A vibration reducing apparatus according to claim 43, wherein at least one of said axially-directed members is provided in a range of 90° or substantially 90° sandwiched between said first and second driving force generation devices.

45. A vibration reducing apparatus housed in the internal periphery of a tubular member, comprising:

a vibration reducing optical system which reduces a vibration;

a supporting frame which supports said vibration reducing optical system; and a drive unit which drives said supporting frame in a direction perpendicular or substantially perpendicular to an optical axis;

wherein said supporting frame being provided, at least in a part of the external periphery thereof, with a gap portion forming a gap to the internal periphery of said tubular member; and there is provided, in said gap portion, a supporting unit which movably supports said supporting frame.

46. A vibration reducing apparatus according to claim 45, wherein said supporting unit includes:

a guide unit in contact with said supporting frame which guides said supporting frame in a predetermined direction; and a biasing unit which biases said supporting frame toward said guide unit.

47. A vibration reducing apparatus according to claim 45, wherein, in said gap portion, there is provided a position detecting unit which detects the position of said vibration reducing optical system.

48. A vibration reducing apparatus according to claim 45, wherein said drive unit includes:

a first driving force generation device which drives said vibration reducing optical system in a first direction; and a second driving force generation device which drives said vibration reducing optical system in a second direction which is skewed relative to said first direction;

said first and second driving force generation devices are positioned with a mutual angular distance of 90° or substantially 90° therebetween about the optical axis; and said supporting frame is provided with a mounting portion protruding from the external periphery thereof and serving to mount at least a part of said first and second driving force generation devices.

49. A vibration reducing apparatus according to claim 48, wherein said first and second driving force generation devices are voice coil motors.

50. A vibration reducing apparatus according to claim 48, wherein said connecting units are axially-directed members provided in three positions with a mutual angular distance of 120° about the optical axis.

51. A vibration reducing apparatus according to claim 50, wherein at least one of said axially-directed members is provided in a range of 90° or substantially 90° sandwiched between said first and second driving force generation devices.

* * * * *